United States Patent
Zosel et al.

(10) Patent No.: US 11,943,488 B2
(45) Date of Patent: Mar. 26, 2024

(54) SYSTEMS AND METHODS FOR ASSIGNING ADVERTISEMENTS ACROSS MEDIA CONTENT PROVIDERS

(71) Applicant: WideOrbit LLC, San Francisco, CA (US)

(72) Inventors: Trevan Zosel, Bothell, WA (US); Brian Edward Thoman, Everett, WA (US); Francisco Lopez Alvarez, Woodinville, WA (US); William E. Offeman, Redmond, WA (US)

(73) Assignee: WideOrbit LLC, San Francisco, CA (US)

( * ) Notice: Subject to any disclaimer, the term of this patent is extended or adjusted under 35 U.S.C. 154(b) by 120 days.

(21) Appl. No.: 17/716,920

(22) Filed: Apr. 8, 2022

(65) Prior Publication Data
US 2023/0328299 A1 Oct. 12, 2023

(51) Int. Cl.
*H04N 21/81* (2011.01)
*H04H 60/37* (2008.01)
*H04N 21/234* (2011.01)
*H04N 21/262* (2011.01)

(52) U.S. Cl.
CPC .... *H04N 21/23424* (2013.01); *H04H 60/375* (2013.01); *H04N 21/26241* (2013.01); *H04N 21/812* (2013.01)

(58) Field of Classification Search
CPC .................................................. H04N 21/812
See application file for complete search history.

(56) References Cited

U.S. PATENT DOCUMENTS

| | | | | |
|---|---|---|---|---|
| 10,700,798 B1 * | 6/2020 | Elnajjar | ................. | H04H 60/06 |
| 2013/0144725 A1 * | 6/2013 | Li | .................... | H04N 21/25891 |
| | | | | 705/14.66 |
| 2021/0385528 A1 * | 12/2021 | Sandholm | ........ | H04N 21/44222 |

* cited by examiner

*Primary Examiner* — Michael H Hong
(74) *Attorney, Agent, or Firm* — Seed Intellectual Property Law Group LLP

(57) ABSTRACT

Systems, methods, and articles for assigning content, such as advertisements, to similar content breaks, such as advertisement placement opportunities, across multiple content providers. The systems disclosed herein automatically identify similar advertisement placement opportunities, such as advertisement placement opportunities occurring at the same time, across a plurality of media content providers, and assign an indicated advertisement spot to as many of the identified advertisement placement opportunities as possible. This is achieved by re-assigning advertisement spots which are already assigned to a slot in one of the advertisement placement opportunities to another slot in order to allow the indicated advertisement spot to be assigned to the slot.

18 Claims, 12 Drawing Sheets

SYSTEMS AND METHODS FOR ASSIGNING ADVERTISEMENTS ACROSS MEDIA CONTENT PROVIDERS

BACKGROUND

Technical Field

The present disclosure relates the field of computer technology, and more particularly, to computer systems and methods that facilitate the delivery of content to consumers.

Description of the Related Art

Content providers such as radio stations and networks, television stations and networks, and Webcasters provide programming including content which is the subject of programming. Content providers' delivery of content is often via broadcasts or Webcasts (collectively, "mediacasts"). While content providers may employ repeaters and the like, broadcasts are typically limited in range to a geographic region.

Programming often includes advertisements interspersed with the subject matter of the programming. The advertisements may occur in segments or slots sometimes referred to as "ad breaks." Content providers typically sell advertising time to generate revenue to fund operation, as well as generate profits, where the content provider is a commercial entity rather than a nonprofit entity. Advertisers typically offer to buy this advertising time to advertise their products or services. For example, Advertiser A may offer Content Provider B $1000 to buy advertisement time played during Television Show C. Advertisers may also offer to buy advertisement time from multiple content providers during multiple television shows. For example, Advertiser A may also offer Content Provider D $1000 to buy advertisement time played during Television Show E.

New approaches that automate the various activities related to buying, selling, and placement of new materials, for instance, advertisements, in mediacasts are desirable.

BRIEF SUMMARY

A method of operating a computer system to assign advertisements across media content providers may be summarized as including: receiving data indicating a plurality of media content providers, each media content provider having one or more advertisement placement opportunities, each advertisement placement opportunity having one or more slots; for each media content provider of the plurality of media content providers: receiving data indicating one or more advertisement spots, wherein each advertisement spot is assigned to at least one slot included in the one or more advertisement placement opportunities of the media content provider, each advertisement spot being assigned a priority score; receiving an indication that an advertisement spot is to be assigned to a slot of a plurality of advertisement placement opportunities, the plurality of advertisement placement opportunities comprising at least one advertisement placement opportunity of two or more media content providers of the plurality of media content providers; and for each advertisement placement opportunity of the plurality of indicated advertisement placement opportunities: determining whether there are any slots included in the advertisement placement opportunity to which an advertisement spot is not assigned; based on a determination that there is a slot to which an advertisement spot is not assigned, assigning the indicated advertisement spot to the slot; and based on a determination that there are no slots included in the advertisement placement opportunity to which an advertisement spot is not assigned: determining which advertisement spot has the lowest priority score; un-assigning the previously assigned advertisement spot determined to have the lowest priority score from the slot to which it is assigned; assigning the indicated advertisement spot to the slot to which the previously assigned advertisement was previously assigned; and re-assigning the previously assigned advertisement spot to a new slot within an advertisement placement opportunity.

Each advertisement placement opportunity may correspond to a pre-determined time period, and the method may further include: receiving an indication of a time period; and identifying the plurality of advertisement placement opportunities based on the indicated time period, such that the respective time periods corresponding to each of the indicated advertisement placement opportunities overlap with each other.

The pre-determined time period may be thirty minutes.

The method may further include: determining whether one or more advertisement placement opportunities does not have a slot to which the advertisement spot can be assigned; receiving input indicating that the time period should be extended; and extending the time period based on the input.

The time periods for the advertisement placement opportunities corresponding to at least one media content provider of the two or more media content providers may be in a different time zone than the advertisement placement opportunities corresponding to at least one other media content provider of the two or more media content providers.

Each media content provider of the two or more media content providers may provide content to at least one geographic region, and the at least one geographic region corresponding to at least one media content provider of the two or more media content providers may be different from the geographic region of at least one other media content provider of the two or more media content providers.

Each advertisement spot may further comprise advertisement information, and assigning the indicated advertisement spot to a slot may further include: identifying one or more rules for placing advertisement spots in slots relative to other advertisement spots placed in other slots; determining whether to assign the indicated advertisement spot to a slot based on the identified one or more rules, the advertisement information for the indicated advertisement spot, and the advertisement information for at least one other advertisement spot; and preventing the indicated advertisement spot from being assigned to the slot based on a determination that the indicated advertisement spot should not be assigned to the slot.

The method may further include: determining, based on pre-configured rules, whether the indicated advertisement spot should be un-assigned from at least one slot included in the advertisement placement opportunities to which the advertisement spot is assigned; and un-assigning the indicated advertisement spot from the at least one slot.

Assigning the indicated advertisement spot to a slot may further include: determining whether a creative material has been received for the indicated advertisement spot; and preventing the indicated advertisement spot from being re-assigned to another slot based on a determination that the creative material has been received for the indicated advertisement spot.

The method may further include determining whether the number of media content providers associated with the indicated advertisement placement opportunities which have a slot to which the indicated advertisement spot can be assigned does not exceed a predetermined number of media content providers; based on a determination that the number of media content providers does not exceed the predetermined number of media content providers, presenting an option to un-assign the indicated advertisement spot from one or more slots; receiving input indicating that the indicated advertisement spot should be un-assigned from one or more slots; and un-assigning the indicated advertisement spot from one or more slots based on the received input.

Receiving data indicating one or more advertisement spots may further include calculating the priority score for each slot associated with the media content provider based on information received from the media content provider.

The method may further include: receiving a creative for the indicated advertisement spot; and transmitting the creative to each media content provider associated with the indicated advertisement placement opportunities which include a slot to which the indicated advertisement spot is assigned.

A system to optimize the placement of advertisement spots at advertisement placement opportunities offered by multiple media content providers, the system comprising: at least one nontransitory processor-readable storage medium that stores at least one of instructions or data; and at least one processor communicatively coupled to the at least one nontransitory processor-readable storage medium, wherein the instructions or data cause the at least one processor to: receive data representing a plurality of media content providers, each media content provider having one or more advertisement placement opportunities, each advertisement placement opportunity having one or more slots; for each media content provider of the plurality of media content providers: receive data indicating one or more advertisement spots, wherein each advertisement spot is assigned to at least one slot included in the one or more advertisement placement opportunities of the media content provider, each advertisement spot being assigned a priority score; receive an indication that an advertisement spot is to be assigned to a slot of a plurality of advertisement placement opportunities, the plurality of advertisement placement opportunities comprising at least one advertisement placement opportunity of two or more media content providers of the plurality of media content providers; and for each advertisement placement opportunity of the plurality of indicated advertisement placement opportunities: determine whether there are any slots included in the advertisement placement opportunity to which an advertisement spot is not assigned; based on a determination that there is a slot to which an advertisement spot is not assigned, assign the indicated advertisement spot to the slot; and based on a determination that there are no slots included in the advertisement placement opportunity to which an advertisement spot is not assigned: determine which advertisement spot has the lowest priority score; un-assign the previously assigned advertisement spot determined to have the lowest priority score from the slot to which it is assigned; assign the indicated advertisement spot to the slot to which the previously assigned advertisement was previously assigned; and re-assign the previously assigned advertisement spot to a new slot within an advertisement placement opportunity.

In the system to optimize the placement of advertisement spots at advertisement placement opportunities offered by multiple media content providers each advertisement placement opportunity may correspond to a predetermined time period, and the processor may be further caused to: receive an indication of a time period; and identify the indicated advertisement placement opportunities based on the indicated time period, such that the respective time periods corresponding to each of the indicated advertisement placement opportunities overlap with each other.

In the system to optimize the placement of advertisement spots at advertisement placement opportunities offered by multiple media content providers the processor may be further caused to: determine whether one or more advertisement placement opportunities does not have a slot to which the advertisement spot can be assigned; receive input indicating that the time period should be extended; and extending the time period based on the input.

In the system to optimize the placement of advertisement spots at advertisement placement opportunities offered by multiple media content providers each advertisement spot may include advertisement information and causing the processor to assign the indicated advertisement spot to a slot may further include causing the processor to: identify one or more rules for placing advertisement spots in slots relative to other advertisement spots placed in slots; determine whether to assign the indicated advertisement spot to a slot based on the identified one or more rules, the advertisement information for the indicated advertisement spot, and the advertisement information for at least one other advertisement spot; and prevent the indicated advertisement spot from being assigned to the slot based on a determination that the indicated advertisement spot should not be assigned to the slot.

In the system to optimize the placement of advertisement spots at advertisement placement opportunities offered by multiple media content providers causing the processor to assign the indicated advertisement spot to a slot may further include causing the processor to: determine whether creative material has been received for the indicated advertisement spot; and prevent the indicated advertisement spot from being re-assigned to another slot based on a determination that the creative material has been received for the indicated advertisement spot.

In the system to optimize the placement of advertisement spots at advertisement placement opportunities offered by multiple media content providers the processor may be further caused to: receive creative material for the indicated advertisement spot; and transmit the creative material to each media content provider associated with the indicated advertisement placement opportunities which includes a slot to which the indicated advertisement spot is assigned.

In the system to optimize the placement of advertisement spots at advertisement placement opportunities offered by multiple media content providers the processor may be further caused to: determine a score goal based on one or more of: an impression goal, a minimum number of advertisement spots assigned to advertisement placement opportunities, and a CPM goal; determine a score for the indicated advertisement placement opportunities which have a slot to which the advertisement spot can be assigned based on one or more of: a projected number of impressions for each of the indicated advertisement placement opportunities, the number of indicated advertisement placement opportunities to which the indicated advertisement spot is assigned, and a projected CPM for each of the indicated advertisement placement opportunities; determine whether the score for the indicated advertisement placement opportunities exceeds the score goal; based on a determination that the score of the indicated advertisement placement opportunities does not exceed the score goal, present to a user an option to un-assign the indicated advertisement spot from one or more slots; receive input indicating the at the indicated advertisement spot should be un-assigned from one or more slots; and un-assign the indicated advertisement spot from one or more slots based on the received input.

A nontransitory processor-readable storage medium may store at least one of instructions or data, the instructions or data, when executed by at least one processor, may cause the at least one processor to: receive data representing a plurality of media content providers, each media content provider having one or more advertisement placement opportunities, each advertisement placement opportunity having one or more slots; for each media content provider of the plurality of media content providers: receive data indicating one or more advertisement spots, wherein each advertisement spot is assigned to at least one slot included in the one or more advertisement placement opportunities of the media content provider, each advertisement spot being assigned a priority score; receive an indication that an advertisement spot is to be assigned to a slot of a plurality of advertisement placement opportunities, the plurality of advertisement placement opportunities comprising at least one advertisement placement opportunity of two or more media content providers of the plurality of media content providers; and for each advertisement placement opportunity of the plurality of indicated advertisement placement opportunities: determine whether there are any slots included in the advertisement placement opportunity to which an advertisement spot is not assigned; based on a determination that there is a slot to which an advertisement spot is not assigned, assign the indicated advertisement spot to the slot; and based on a determination that there are no slots included in the advertisement placement opportunity to which an advertisement spot is not assigned: determine which advertisement spot has the lowest priority score; un-assign the previously assigned advertisement spot from the slot to which it is assigned; assign the indicated advertisement spot to the slot to which the previously assigned advertisement was previously assigned; and re-assign the previously assigned advertisement spot to a new slot within an advertisement placement opportunity.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
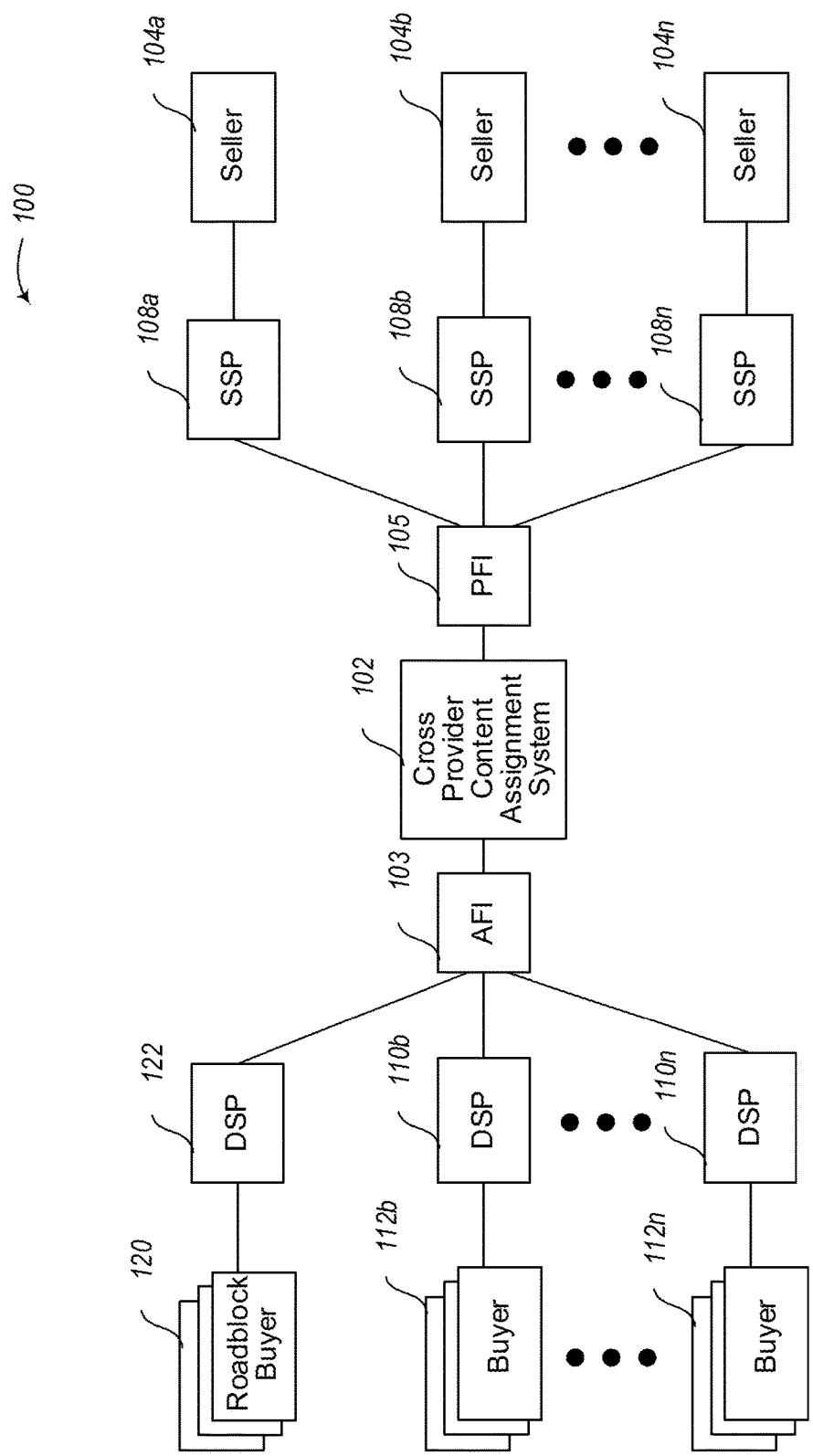
FIG. 1 shows an example networked environment according to one illustrated implementation in which various apparatus, methods and articles described herein may operate.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to computer-implemented systems and methods of automating and optimizing the placement of advertisements within advertisement placement opportunities offered by multiple media content providers. Buying and selling television, radio or digital advertising has traditionally been a highly manual process and requires many participants to execute orders. Layering in audience and pricing data adds another level of complexity to the campaign execution workflow.

Furthermore, buying advertisement spots from multiple media content providers for similar advertisement placement opportunities adds yet another layer of complexity. Typically, each buyer must interface and negotiate with each media content provider individually, which requires the buyer to interact with a different computer system, user interface, etc., for each media content provider if the buyer wishes to place their advertisement in similar advertisement placement opportunities for multiple media content providers.

Additionally, buying advertisement spots from multiple media content providers for similar advertisement placement opportunities allows a buyer to ensure that their advertisement receives a significant portion of the total number of impressions available across advertisement placement opportunities offered by different media content providers in the same time period (referred to as "unduplicated reach"). As mentioned above, obtaining this unduplicated reach manually requires a buyer to interface with many different media content providers to individually negotiate and place their advertisement in the correct advertisement placement opportunities. Furthermore, media content providers may not be able to provide the correct advertisement slots or advertisement placement opportunities to allow a buyer to obtain the unduplicated reach. Thus, in order for the buyer and the multiple media content providers to reach an agreement which results in unduplicated reach, each media content provider must spend large amounts of computing resources and time to determine which advertisement slots are available, which assigned advertisements can be moved, etc., until the buyer is able to find a time period with advertisement placement opportunities offered by each media content provider to which the buyer's advertisement can be assigned. Furthermore, the buyer must also use a large amount of their own computing resources and time to work with each of the media content providers individually in order to achieve unduplicated reach for their advertisement.

In conventional workflows, an advertiser, or "buyer", contacts multiple networks, or "media content providers," to negotiate and purchase "advertisement placement opportunities." The advertisement placement opportunities include one or more breaks within media content. Each break includes one or more "slots," which each represent a portion of the time allotted to the break. In some embodiments, a break is referred to as a "pod." A media content provider may represent an individual media outlet (such as a single television station) or multiple media outlets (such as a network of multiple television stations).

When an advertisement is assigned to a break, the advertisement is assigned to one or more slots included in the break. The one or more slots within a break to which the advertisement is assigned are collectively referred to as a "spot." Thus, a spot and an advertisement together are referred to as an "advertisement spot." For example, a break may be 90 seconds long with six 15-second slots. A first advertisement may be assigned to a first slot 15-second slot within the break, and thus the first slot would be referred to as a spot. A second advertisement may be assigned to a second and a third 15-second slot, thus occupying 30-seconds within the break, and the second slot and third slot may also be referred to as a spot. While the example provided uses uniform lengths of time for each slot included in a break, embodiments are not so limited, and the length of time allocated to at least one slot within a break may be shorter or longer than the length of time allocated to at least one other slot within the break. Furthermore, assigning an "advertisement spot" includes assigning an advertisement to one or more slots, placing an advertisement at one or more spots, etc. An "advertisement spot" may refer to an advertisement and one or more slots to which the advertisement is assigned.

For example, the advertisement placement opportunity may represent an opportunity to air the advertisement during a television show, and each break may represent a commercial break within the television show. Once the buyer has purchased the advertisement placement opportunity, the media content provider assigns content provided by the buyer to a break included in the advertisement placement opportunity. The buyer may negotiate a price with each of these providers, only to find out later on that some media content providers are unable to provide the advertisement placement opportunity which the buyer needed to achieve unduplicated reach, resulting in wasted time, effort, and, in the case of negotiations and purchases that use computer systems or automation, computer resources.

An advertisement spot may be associated with content which will be displayed, aired, shown, presented, etc., by a media content provider during the time represented by the one or more slots to which the advertisement is assigned. The content may be referred to as material, a creative, a creative asset, creative material, a copy, or other terms used to describe content associated with an advertisement.

An advertisement is "cleared" when a buyer's offer to buy an advertisement placement opportunity is accepted by a seller, or media content provider and the buyer's advertisement is published in the advertisement placement opportunity. However, if a buyer would like to buy multiple advertisement placement opportunities from multiple media content providers, such as, for example, advertisement placement opportunities which occur during the same half-hour in a geographic region, they must individually offer to buy the advertisement placement opportunity from each of the media content providers. Additionally, the buyer may not be able to ensure that the advertisement is shown in the same, or similar, break during the advertisement placement opportunities. Furthermore, the buyer may be unable to ensure that each of the offers to buy advertisement placement opportunities are accepted by the seller.

As a result, buyers are unable to reliably ensure that their advertisement appears in similar advertisement placement opportunities across multiple media content providers. Furthermore, the buyer and each of the sellers must use additional resources, such as computing resources, processing power, memory, data storage, etc., in order for a buyer to buy similar advertisement placement opportunities from each seller. This results in wasted time, effort, and computing resources when the buyer is unable to buy all of the similar advertisement placement opportunities.

Implementations of the present disclosure are directed to computer-implemented systems and methods for placement of content, such as advertisements, within similar content-breaks for multiple media content providers. Thus, the aforementioned inefficient and unreliable processes is improved to provide optimization that was previously not possible using conventional workflows.

Such implementations are thus able to improve the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by allowing buyers to specify a time period, or other attribute of an advertisement placement opportunity, and to automatically place their advertisement within advertisement placement opportunities with the specified attribute and which are offered by multiple media content providers, the buyers do not need to expend computing resources, such as those used to generate user interfaces, present data related to advertisement placement opportunities, assist the buyer in offering to buy the advertisement placement opportunities, sending a copy or creative to the seller, etc., for interacting with each media content provider's systems. Furthermore, the media content providers do not need to expend similar computing resources for interacting with the buyer.

In at least some implementations, buyers and sellers can trade mediacast (e.g., broadcast, Webcast) advertisement inventory (e.g., direct or programmatically) at local, national, and/or worldwide levels. The types of media traded via may simultaneously include numerous types of media, including TV, cable, satellite, radio, outdoor, display, digital, print, etc. Such programmatic advertising implements data-driven automation of audience-based advertising operations which inverts the industry standard in which marketers rely on show ratings to determine desirable audiences for the marketers' advertisements.

In at least some implementations, the cross provider content assignment systems disclosed herein interface with demand side platforms (DSPs) that optimize offers to guarantee that an advertisement is included in multiple advertisement placement opportunities across multiple media content providers. Sellers enjoy seamless transaction workflow for getting advertisements from proposal, to publishing, and to billing that delivers a significant reduction in time spent on reconciliation and "make-goods" and streamlines processes for creative management and revenue management across direct and programmatic sales channels.

The advertiser-facing interface facilitates creative placement and reviewing for the buy side, and may have transcoding and approval tools for the sell side. For example, in some implementations, once an advertisement transaction is approved, the advertiser-facing interface sends the advertisement directly to a broadcaster's traffic system. In some implementations, the advertiser-facing interface facilitates a buyer in specifying a time or attribute for advertisement placement opportunities, such that the cross provider content assignment system is able to assign their advertisement to advertisement placement opportunities which occur at the specified time or have the specified attribute. The cross provider content assignment system may receive a creative or copy for the advertisement, and transmit the creative or copy to each of the media content providers associated with an advertisement placement opportunity to which the advertisement is assigned.

In some implementations, the cross provider content assignment systems disclosed herein automate aspects of billing, reconciliation, and creative execution. In some implementations, the cross provider content assignment systems may be integrated with advertisement management software and sales and traffic management systems.

FIG. 1 shows an example networked environment 100 according to one illustrated implementation in which various apparatus, methods and articles described herein may operate. The environment 100 includes a cross provider content assignment system 102 an advertiser-facing interface (AFI) 103, a media content provider-facing interface (PFI), a number of sellers or content providers 104A-104N (collectively 104), a number of seller side platforms (SSPs) 108A-108N (collectively 108), a number of demand side platforms (DSPs) 110A-110N (collectively 110) and 122, a number of buyers 112B-112N (collectively 112), such as advertisers or agencies, and a roadblock buyer 120, such as an advertiser or agency, all communicatively coupled by one or more networks or other communications channels. The various components of the environment may be distributed or integrated in any number of ways. For example, in at least some implementations, two or more of the DSPs 110, DSP 122, AFI 103, cross provider content assignment system 102, and PFI 105 may be integrated into a single platform provided by one or more entities.

The sellers 104 may take a variety of forms, for example, radio stations or broadcasters, television stations or broadcasters, other terrestrial or satellite broadcasters or multicasters (not shown), Webcasters, printed content (e.g., print media) providers, outdoor content (e.g., billboards) providers, etc. The sellers 104 may, or may not, own the content that they provide. The sellers 104 utilize the PFI 105 to access the cross provider content assignment system 102. On the buy side, the buyers 112 (e.g., advertisers, agencies) and roadblock buyer 120 may interface with the system 102 via the AFI 103 through the buyers' respective DSPs 110 and 122.

The roadblock buyer 120 is a buyer which wishes to buy advertisement spots with multiple advertisement placement opportunities which have a similar attribute and which are offered by multiple media content providers. For example, the roadblock buyer 120 may wish to place an advertisement spot with multiple media content providers at a certain time, such as, for example, between 3:00 PM and 3:15 PM. In this example, the roadblock buyer 120 may specify the time period during which the advertisement spot should air, and the cross provider content assignment system 102 interfaces with multiple sellers in order to ensure that the roadblock buyer's 120 advertisement spot airs during the specified time period. In some embodiments, the roadblock buyer 120 provides additional information to the cross provider assignment system 102, such as: a goal of the roadblock buyer 120, such as an impression goal, a minimum number of media content providers associated with advertisement placement opportunities to which the advertisement spot is assigned, a minimum number of advertisement placement opportunities to which the advertisement spot is assigned, a CPM goal, or other goals the roadblock buyer 120 may have; one or more creatives for an advertisement spot; instructions, rules, or guidelines for the cross provider assignment system 102 to use to un-assign the roadblock buyer's 120 advertisement spot from advertisement placement opportunities (such as un-assigning the advertisement spot if the advertisement spot does not meet a goal of the roadblock buyer 120); a type or class of media content within which the roadblock buyer 120 wishes their advertisement spot to be placed (such as sports shows, reality television shows, situational comedy shows, news programs, etc.); or other information usable to assign an advertisement spot 120 to a plurality of advertisement placement opportunities which are offered by multiple media content providers.

With presently available systems, it is difficult for advertisers to ensure that their advertisement appears in advertisement placement opportunities associated with multiple media content providers and which occur during a certain time, or share a similar attribute, without manually identifying each potential advertisement placement opportunity and interacting with each media content provider associated with each advertisement placement opportunity to buy time during the advertisement placement opportunity. Further, advertisers may not want to place their advertisement in the advertisement placement opportunities if they are not able to buy a certain number of the advertisement placement opportunities. Thus, they may take back their offer, causing a waste of effort and resources, such as computing resources, for both the buyers and the sellers.

To address these and other issues, one or more implementations of the present disclosure identify advertisement placement opportunities associated with multiple sellers and which occur during a certain time, or share a similar attribute, and place advertisements within the advertisement placement opportunities. The one or more implementations of the present disclosure are additionally able to re-assign advertisement spots already assigned to a slot within the advertisement placement opportunity in order to ensure that the advertisements are placed in as many of the identified advertisement placement opportunities as possible.

In an example implementation, a roadblock buyer 120 may specify that an advertisement spot should be placed within multiple advertisement placement opportunities defined by a plurality of the sellers 104a-104n. Each advertisement placement opportunity may include a plurality of breaks within which an advertisement may be placed. Each seller 104a-104n also negotiates with other buyers, to place an advertisement within the same advertisement placement opportunity. The cross provider content assignment system 102 ensures that the advertisement spot is placed within a plurality of the advertisement placement opportunities, and re-assigns other advertisement spots already assigned to the advertisement placement opportunities as needed.

Each seller 104a-104n may additionally provide the cross provider content assignment system 102 with one or more priority scores for at least one spot included in the advertisement placement opportunities associated with the respective seller. The cross provider content assignment system 102 may use the priority score to determine whether an advertisement can be re-assigned, determine which advertisement spot to re-assign, etc. In some implementations, the priority score is based on one or more of: a priority code, a spot rate, or other data useful for calculating a priority score for an advertisement spot within an advertisement placement opportunity. In some implementations, the cross provider content assignment system 102 generates the priority score.

Furthermore, each seller 104a-104n may additionally provide the cross provider content assignment system 102 with data indicating one or more advertisement placement opportunities that the cross provider content assignment system 102 can use to assign advertisement spots across multiple media content providers. For example, a seller 104a may specify that an advertisement placement opportunity occurring at 5:00 pm is eligible for the cross provider content assignment system 102 to assign advertisement spots across multiple media content providers. Likewise, a seller 104b may also specify that an advertisement placement opportunity occurring at the same time is eligible for the cross provider content assignment system 102. The cross provider content assignment system 102 may then assign an advertisement to both advertisement placement opportunities such that the advertisement spot appears at the same, or nearly the same time, during content provided by each of the sellers 104a and 104b. While this example uses advertisement placement opportunities specified by sellers for use by the cross provider content assignment system, one of ordinary skill in the art will realize that the cross provider content assignment system may find advertisement placement opportunities which are offered by different sellers and which match the criteria specified by the buyer, such as a time, and assign an advertisement spot to each of the advertisement placement opportunities without each of the sellers specifying that certain advertisement placement opportunities may be used by the cross provider content assignment system.

Figure 2:
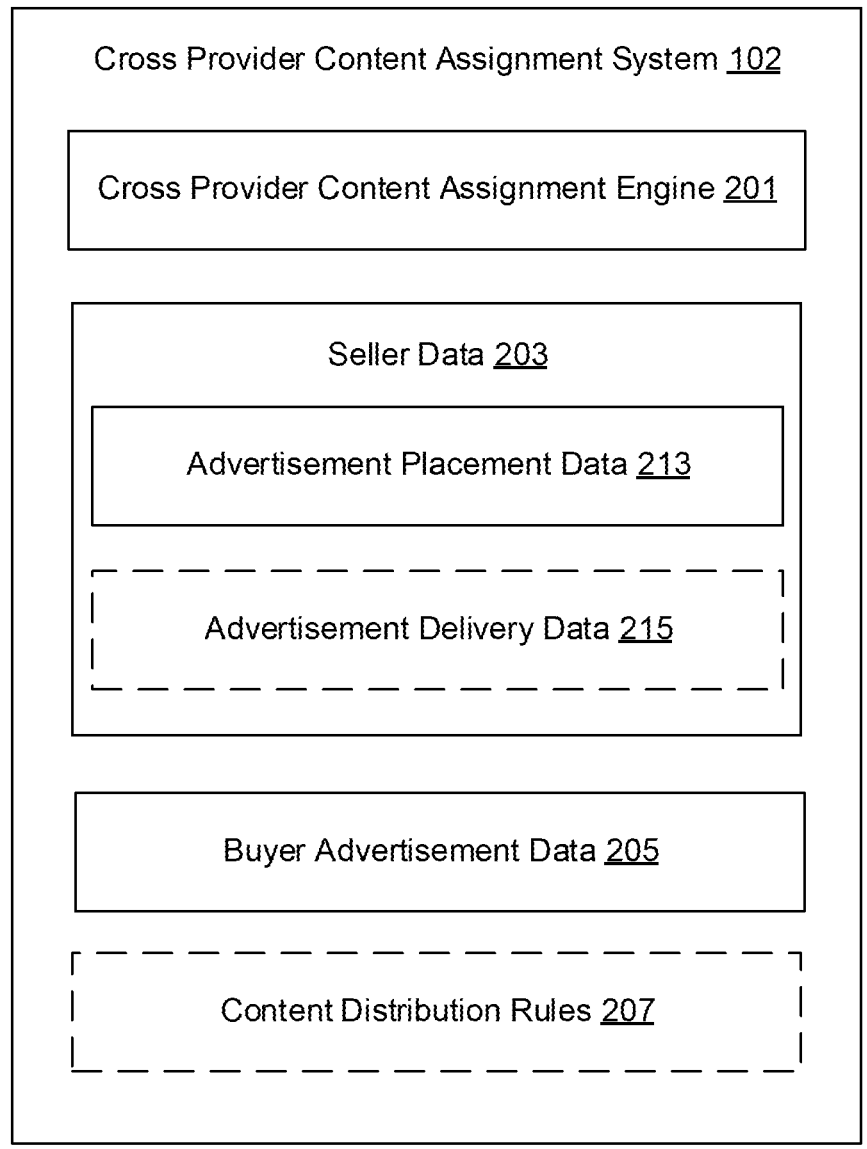
FIG. 2 is a block diagram showing sample elements of a cross provider content assignment system, according to one illustrated implementation.

FIG. 2 is a block diagram showing sample elements of a cross provider content assignment system 102, according to one illustrated implementation. The cross provider content assignment system 102 includes a cross provider content assignment engine 201, seller data 203, and buyer advertisement data 205. In some implementations, the cross provider content assignment system additionally includes content distribution rules 207. The cross provider content assignment engine 201 uses the seller data 203 and buyer advertisement data 205 to identify advertisement placement opportunities from multiple media content providers which share a common attribute, and assign an advertisement spot associated with a buyer to a plurality of the identified advertisement placement opportunities. The cross provider content assignment engine 201 may also use the seller data 203 to re-assign advertisement spots already assigned to advertisement placement opportunities in order to assign the advertisement spot associated with the buyer.

The seller data 203 includes advertisement placement data 213. The seller data 203 may additionally include advertisement delivery data 215. The advertisement placement data 213 includes data related to advertisement placement opportunities, such as: various attributes of the advertisement placement opportunity, such as an identifier for the media content provider which provided the advertisement placement opportunity, the time of the advertisement placement opportunity, the number of breaks within the advertisement placement opportunity, the advertisements already assigned to the advertisement placement opportunity, at least one product code for the advertisements assigned to the advertisement placement opportunity, a number of impressions for an advertisement placement opportunity, a media or content type for content provided during the advertisement placement opportunity, or other attributes related to an advertisement placement opportunity. The advertisement placement data 213 may additionally include break data related to each of the content breaks ("breaks") included within each advertisement placement opportunity. The break data may include: the number of breaks in the advertisement placement opportunity; an indication of which advertisement spots are currently assigned to each break, or each slot in the respective break, in the advertisement placement opportunity; the number of slots included in each break; a priority score for at least one advertisement spot in a respective break; or other data used to describe the breaks included in an advertisement placement opportunity.

In some implementations, the seller data 203 includes advertisement delivery data 215. The advertisement delivery data 215 may include data related to the "delivery" of an advertisement, i.e. the appearance of the advertisement during the content provided by the seller. The advertisement delivery data 215 may include data related to one or more of: the number of impressions that the advertisement received, website traffic generated by the advertisement, data related to the buyer's social media, the impact of customer bookings, and other data related to the delivery or airing of advertisements.

The buyer advertisement data 205 includes data related to the advertisement which is to be assigned to multiple advertisement placement opportunities across multiple media content providers. The buyer advertisement data 205 may include data: data regarding the buyer, such as the type of industry the buyer operates in, data regarding rules for distribution of the buyer's content, or other data used to describe the buyer; data regarding the advertisement, such as a code identifying the type of good, industry, or service that the advertisement is for, a creative or copy for the advertisement, the length of the advertisement; data regarding a time or attribute for identifying advertisement placement opportunities across media content providers; or other data related to the buyer or the advertisement.

In some implementations, the cross provider content assignment system 102 includes content distribution rules 207. The content distribution rules 207 include rules used by the cross provider content assignment system to distribute advertisement content within an advertisement placement opportunity. The content distribution rules 207 may be used to determine how many advertisements of a certain product type, company, etc., may appear in each break, how much separation there is between advertisements for similar products or services, etc.

Figure 3:
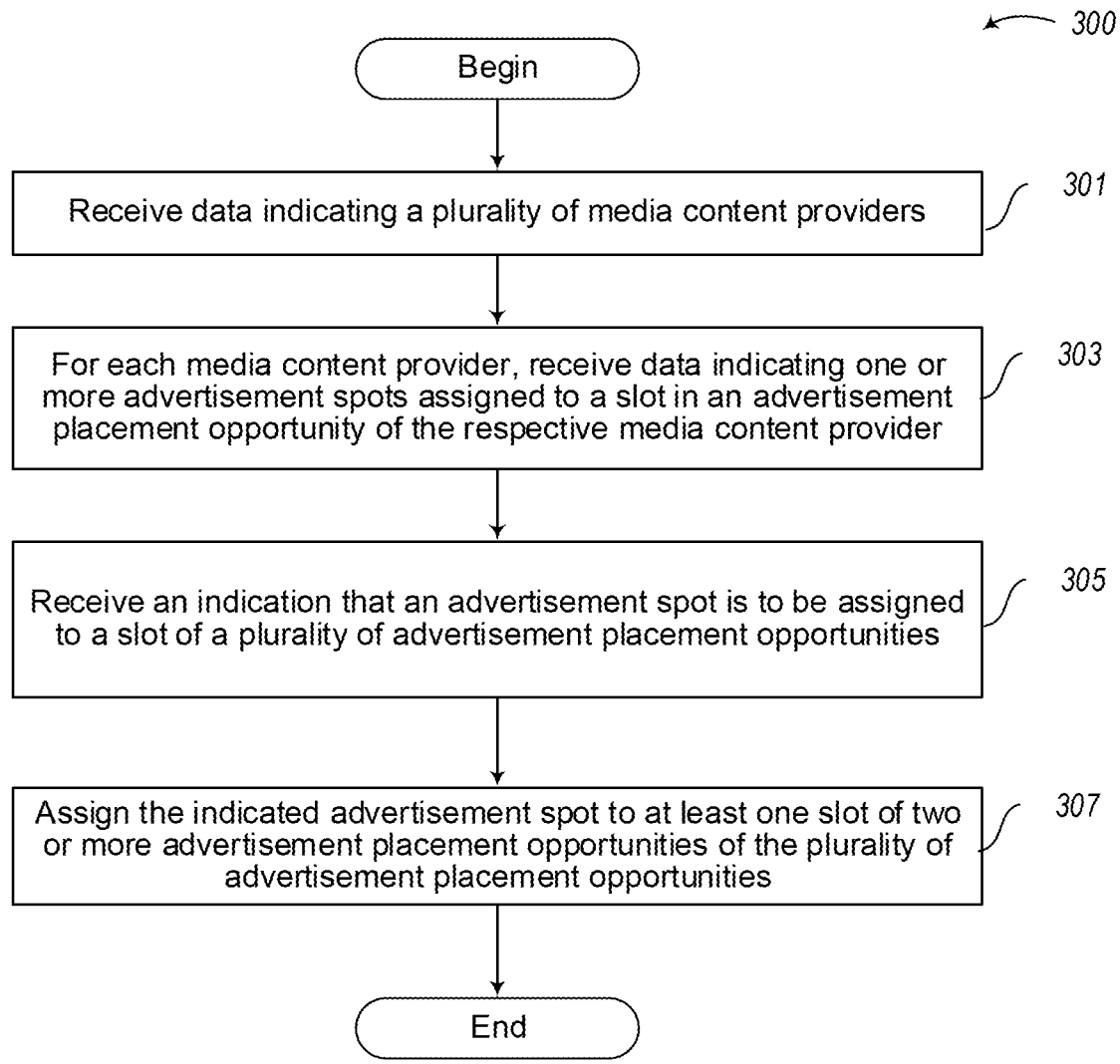
FIG. 3 is a flow diagram showing a method of operating a cross provider content assignment system to assign content, such as advertisement spots, to advertisement placement opportunities which share a common attribute, such as a time for the advertisement placement opportunities, according to one non-limiting illustrated implementation.

FIG. 3 is a flow diagram showing a method 300 of operating a cross provider content assignment system to assign content, such as advertisement spots, to advertisement placement opportunities which share a common attribute, such as a time for the advertisement placement opportunities, according to one non-limiting illustrated implementation. After a start block, the method 300 begins at 301 where the cross provider content assignment system receives data indicating a plurality of media content providers. The data indicating a plurality of media content providers may include data regarding one or more advertisement placement opportunities. Each advertisement placement opportunity may include one or more slots.

At 303, for each media content provider, the cross provider content assignment system receives data indicating one or more advertisement spots assigned to an advertisement placement opportunity of the respective media content provider. At least one advertisement spot assigned to an advertisement placement opportunity may be assigned to at least one slot included in the advertisement placement opportunity. The advertisement placement opportunities may include one or more breaks. Each break may include one or more slots for placing or assigning advertisement spots. The data indicating the one or more advertisement spots may include advertisement information for each of the one or more advertisement spots. The advertisement information may include one or more content distribution rules for the advertisement spot.

At 305, the cross provider content assignment system receives an indication that an advertisement spot is to be assigned to a plurality of advertisement placement opportunities. The indication that an advertisement spot is to be assigned to a plurality of advertisement placement opportunities may include one or more of: an indication of an attribute of an advertisement placement opportunity, an indication of a period of time within which the advertisement placement opportunities should occur, an indication of a minimum number of advertisement placement opportunities to place the advertisement, an indication of one or more geographic regions for the advertisement placement opportunities, an indication of one or more time zones for the advertisement placement opportunities, and an indication of one or more media content providers. The indication that the advertisement spot is to be assigned to a plurality of advertisement placement opportunities may be used to identify one or more advertisement placement opportunities to which the advertisement spot should be assigned. The one or more advertisement placement opportunities may include advertisement placement opportunities for two or more media content providers.

At 307, the cross provider assignment system assigns the indicated advertisement spot to two or more advertisement placement opportunities of the plurality of advertisement placement opportunities. In some implementations, the cross provider assignment system uses the method 400 described in FIG. 4 for assigning the indicated advertisement spot to two or more of the plurality of advertisement placement opportunities.

After 307, the method 300 ends.

Figure 4:
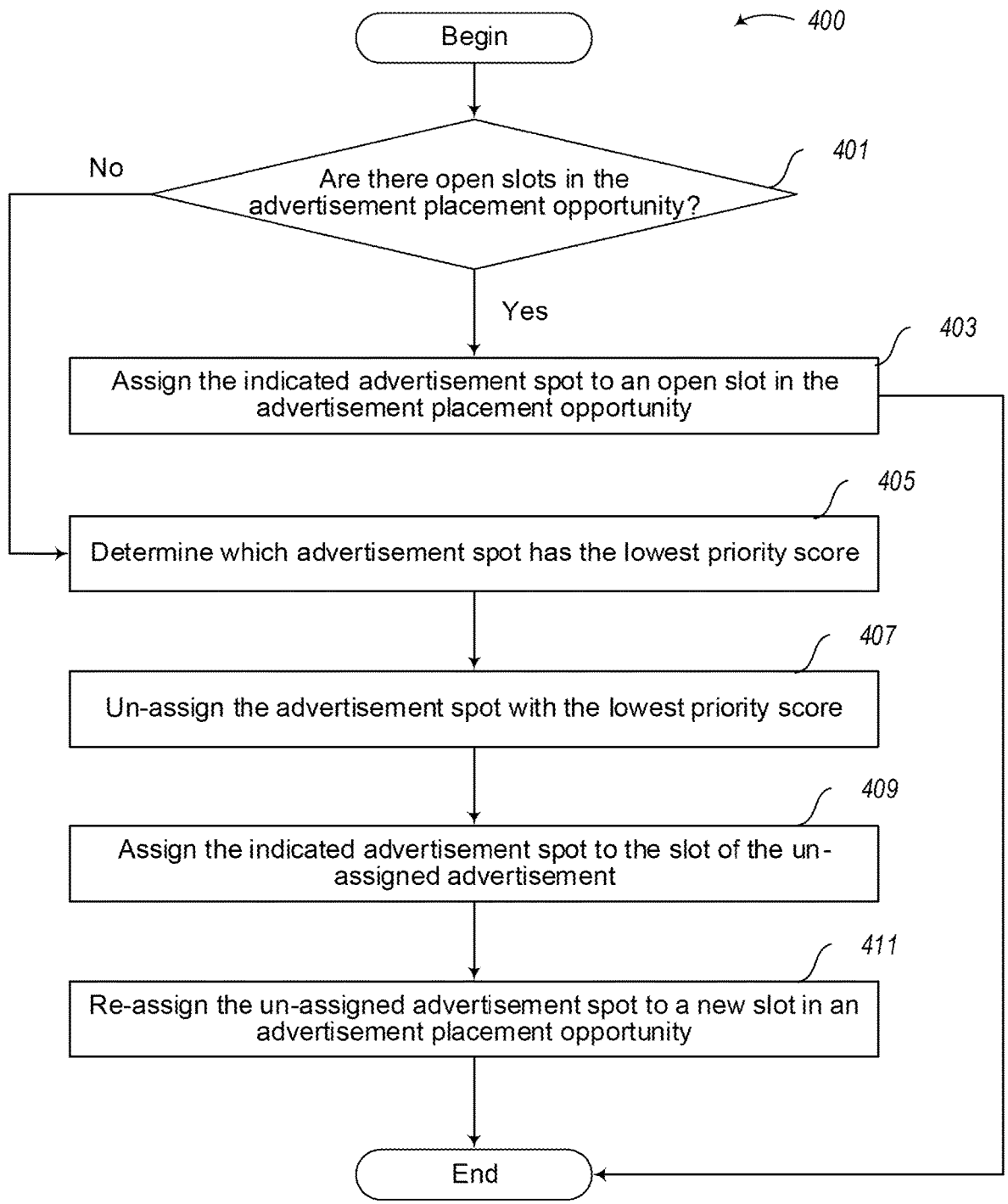
FIG. 4 is a flow diagram showing a method of operating a cross provider assignment system to assign an indicated advertisement spot to a plurality of advertisement placement opportunities for a plurality of media content providers, according to one non-limiting illustrated implementation.

FIG. 4 is a flow diagram showing a method 400 of operating a cross provider assignment system to assign an indicated advertisement spot to a plurality of advertisement placement opportunities for a plurality of media content providers, according to one non-limiting illustrated implementation. After a start block, the method 400 begins at 401, where the cross provider assignment system determines whether there are open slots in the advertisement placement opportunity. If there are open slots in the advertisement placement opportunity, the method 400 proceeds to 403. If there are no open slots in the advertisement placement opportunity, the method 400 proceeds to 405.

In some embodiments, 401 is performed with respect to one or more breaks within the advertisement placement opportunity. The one or more breaks may be identified based on the indication that the advertisement spot is to be assigned to a plurality of advertisement placement opportunities obtained in the method 300. For example, the indication that the advertisement spot is to be assigned to a plurality of advertisement placement opportunities may indicate that the advertisement must appear in a break between 1:00 pm and 1:15 pm. The cross provider assignment system may identify advertisement placement opportunities which include a break between 1:00 pm and 1:15 pm, and will consider breaks scheduled to occur within that time period at 401 when determining if there are open slots in the advertisement placement opportunity.

At 403, the cross provider assignment system assigns the indicated advertisement spot to an open slot in the advertisement placement opportunity. After 403, the method 400 ends.

At 405, the cross provider assignment system determines which advertisement spot in the advertisement placement opportunity has the lowest priority score. The priority score for each advertisement spot may be included in the data indicating the advertisement placement opportunities received in the method 300. The priority score for each advertisement spot may be calculated by the cross provider assignment system.

At 407, the cross provider assignment system un-assigns the advertisement spot with the lowest priority score. The un-assigned advertisement spot may be referred to as the "previously assigned advertisement spot."

At 409, the cross provider assignment system assigns the indicated advertisement spot to the slot that the previously assigned advertisement was un-assigned from.

At 411, the cross provider assignment system re-assigns the previously assigned advertisement spot to a slot within a new advertisement placement opportunity. After 411, the method 400 ends.

Figure 5:
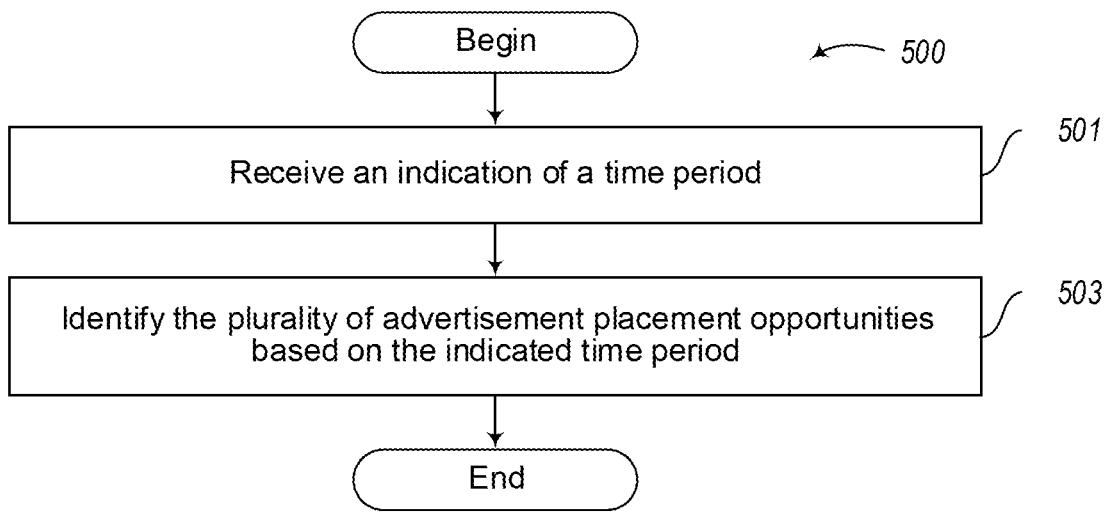
FIG. 5 is a flow diagram showing a method of operating a cross provider assignment system to identify advertisement placement opportunities from multiple media content providers based on an indicated time period, according one non-limiting illustrated implementation.

FIG. 5 is a flow diagram showing a method 500 of operating a cross provider assignment system to identify advertisement placement opportunities from multiple media content providers based on an indicated time period, according one non-limiting illustrated implementation. The method 500 begins, after a start block, at 501 where the cross provider assignment system receives an indication of a time period. The indication of the time period may be received via user input, such as via a user interface such as the AFI 103, PFI 105, or another user interface.

At 503, the cross provider assignment system identifies the plurality of advertisement placement opportunities based on the indicated time period. In some implementations, each of the advertisement placement opportunities in the plurality of advertisement placement opportunities are offered by a different media content provider. For example, the cross provider assignment system may receive an indication that the time period for the advertisement is between 4:00 pm and 4:30 pm. The cross provider assignment system may identify which media content providers have an advertisement placement opportunity between 4:00 pm and 4:30 pm and include the advertisement placement opportunities for the identified media content providers in the plurality of advertisement placement opportunities.

In some implementations, at least two of the different media content providers are in a different time zone. For example, if the indicated time period is between 4:00 pm and 4:30 pm in the Eastern Time Zone, the cross provider assignment system may also identify advertisement placement opportunities belonging to media content providers in the Central Time Zone between 3:00 pm and 3:30 pm, in the Mountain Time Zone between 2:00 pm and 2:30 pm, and in the Pacific Time Zone between 1:00 pm and 1:30 pm. Thus, the cross provider assignment system is able to identify advertisement placement opportunities belonging to media content providers which operate in different time zones.

In some implementations, at least two of the different media content providers are in, or provide content to, a different geographic region. For example, if the indicated time period is between 4:00 pm and 4:30 pm, the cross provider assignment system may identify media content providers with advertisement placement opportunities during that time period in the northeastern and southeastern regions of the United States. In such implementations, the cross provider assignment system may adjust the indicated time period to the time for the time zones corresponding to the identified geographic regions. Alternatively, the cross provider assignment system may not adjust the indicated time period to the time for the time zones corresponding to the identified geographic regions, such that the local time of each region is used (i.e. in the example above, if New York state and California were identified as regions, searching for advertisements between 4:00 pm and 4:30 pm local time in New York state and between 4:00 pm and 4:30 pm local time in California).

In some implementations, the cross provider assignment system receives an indication of one or more attributes of an advertisement placement opportunity at 501. In such implementations, at 503, the cross provider assignment system may identify the plurality of advertisement placement opportunities based on the received time period and the one or more attributes of the advertisement placement opportunity.

For example, a buyer may intend for their advertisement to appear during as many sporting events in the United States as possible between 4:00 pm and 4:30 pm on a Saturday afternoon. The buyer would indicate the time period, 4:00 pm and 4:30 pm on Saturday, and that they would like their advertisement to appear during a sporting event to the cross provider assignment system. The cross provider assignment system identifies advertisement placement opportunities offered by media content providers in the United States which occur between 4:00 pm and 4:30 pm and which occur during sporting events. The cross provider assignment system would then be able to attempt to assign the buyer's advertisement to as many of the identified advertisement placement opportunities as possible.

In some implementations, the cross provider assignment system receives an indication of which media content providers have already received a creative for the indicated advertisement spot. The cross provider assignment system may use the indication of which media content providers have already received the creative to identify advertisement placement opportunities for the indicated advertisement spot.

After 503, the method 500 ends.

Figure 6:
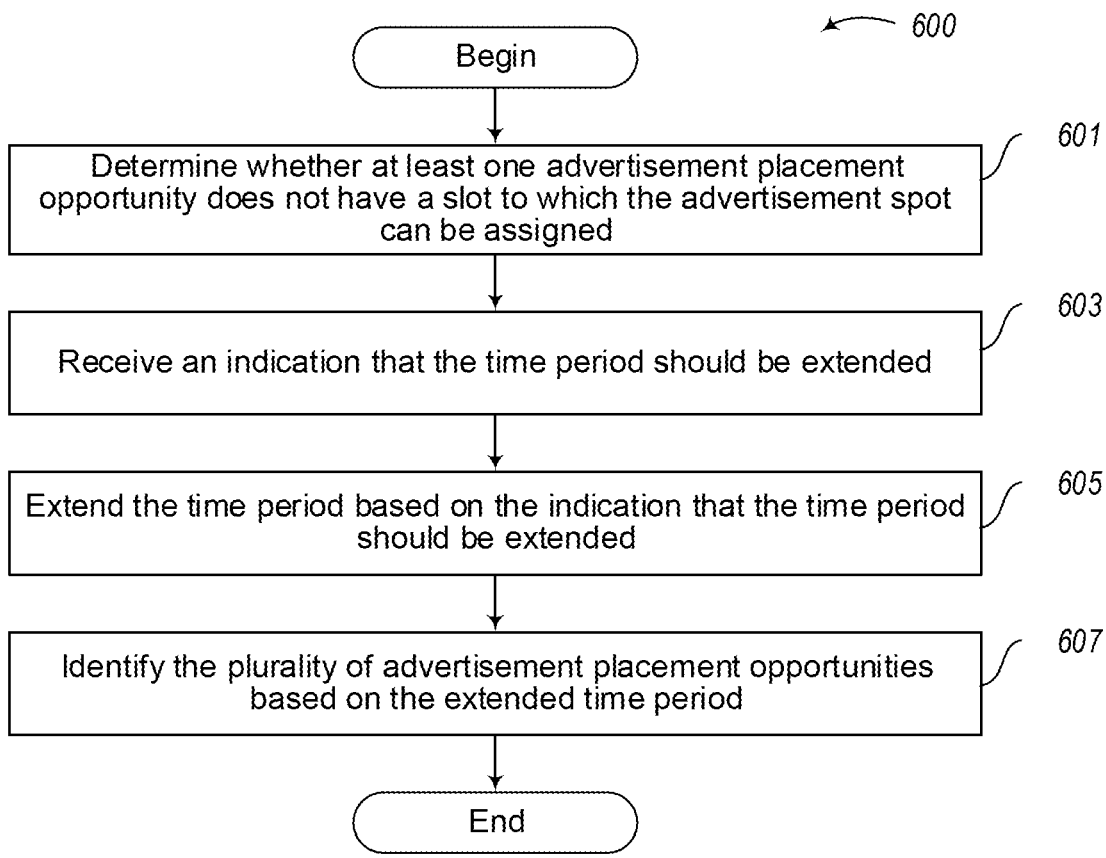
FIG. 6 is a flow diagram showing a method of operating a cross provider assignment system to extend an indicated time period, according to one non-limiting illustrated implementation.

FIG. 6 is a flow diagram showing a method 600 of operating a cross provider assignment system to extend an indicated time period, according to one non-limiting illustrated implementation. After a start block, the method 600 begins at 601, where the cross provider assignment system determines whether at least one advertisement placement opportunity of the identified plurality of advertisement placement opportunities does not have a slot to which the advertisement spot can be assigned. In some implementations, the cross provider assignment system indicates to the user, via a user interface such as the AFI 103, that the at least one advertisement placement opportunity does not have a slot to which the advertisement spot can be assigned.

At 603, the cross provider assignment system receives an indication that the indicated time period should be extended. The indication that the indicated time period should be extended may be obtained via user input, such as via the AFI 103.

At 605, the cross provider assignment system extends the time period based on the indication that the time period should be extended.

At 607, the cross provider assignment system identifies the plurality of advertisement placement opportunities based on the extended time period.

In some implementations, the cross provider assignment system receives an indication of one or more attributes of an advertisement placement opportunity in addition to, or instead of, the indicated time period. The indication that the one or more attributes should be changed may be obtained via the AFI 103. The cross provider assignment system may then change the one or more attributes and identify the plurality of advertisement placement opportunities based on at least one of: the changed one or more attributes, the time period, and the extended time period.

After 607, the method 600 ends.

Figure 7:
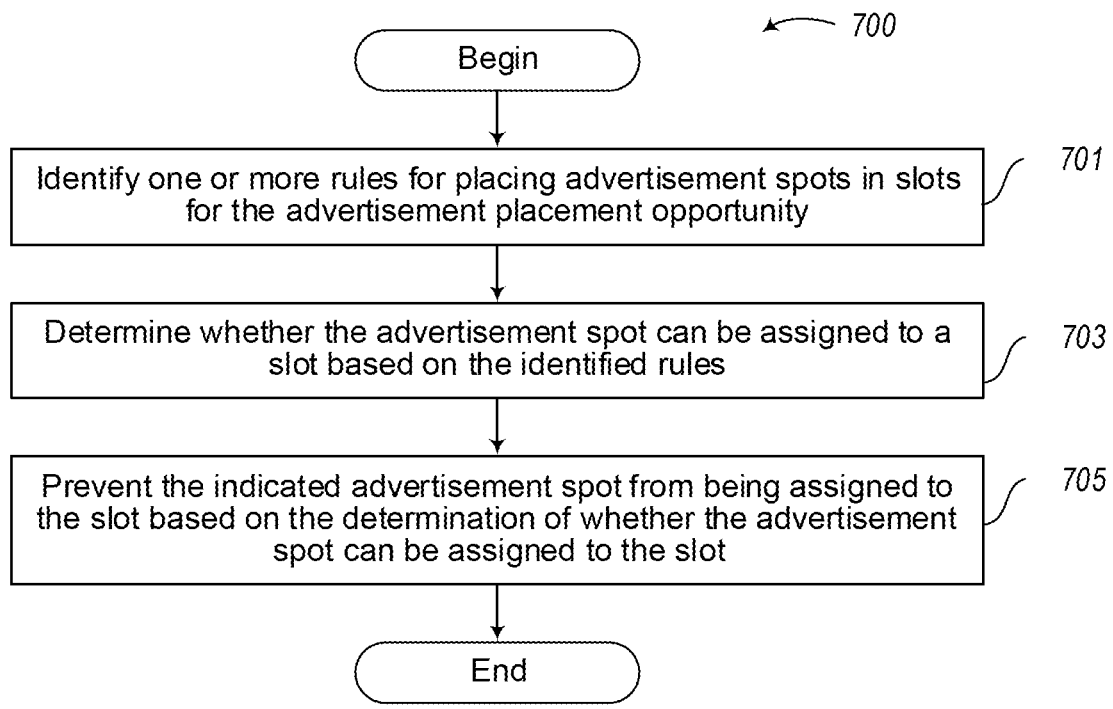
FIG. 7 is a flow diagram showing a method of operating a cross provider assignment system to assign the indicated advertisement spot to a slot based on content distribution rules, according to one non-limiting illustrated implementation.

FIG. 7 is a flow diagram showing a method 700 of operating a cross provider assignment system to assign the indicated advertisement spot to a slot based on content distribution rules, according to one non-limiting illustrated implementation. After a start block, the method 700 begins at 701 where the cross provider assignment system identifies one or more rules for placing advertisement spots in slots for the advertisement placement opportunity. The identified rules may be content distribution rules 207 included in the cross provider content assignment system.

At 703, the cross provider assignment system determines whether an advertisement spot can be assigned to a slot based on the identified rules.

At 705, the cross provider assignment system prevents the indicated advertisement spot from being assigned to the slot based on the determination of whether the advertisement spot can be assigned to the slot.

In some implementations, in response to a determination that the advertisement spot cannot be assigned to the slot, the cross provider assignment system shifts, or switches, advertisement spots placed in slots in the advertisement placement opportunity ("previously assigned advertisements") to other slots in the same advertisement placement opportunity based on the identified rules in order to identify a new slot for the advertisement. In such implementations, the cross provider assignment system assigns the advertisement spot to the new slot. In some implementations, when a new slot which follows the identified rules cannot be identified for the advertisement spot, the cross provider assignment system prevents the identified advertisement spot from being assigned to a slot in the advertisement placement opportunity. In some implementations, when a new slot which follows the identified rules cannot be identified for the advertisement spot, the cross provider assignment system un-assigns an advertisement from a slot to which the identified advertisement spot could be assigned according to the identified rules.

After 705, the method 700 ends.

Figure 8:
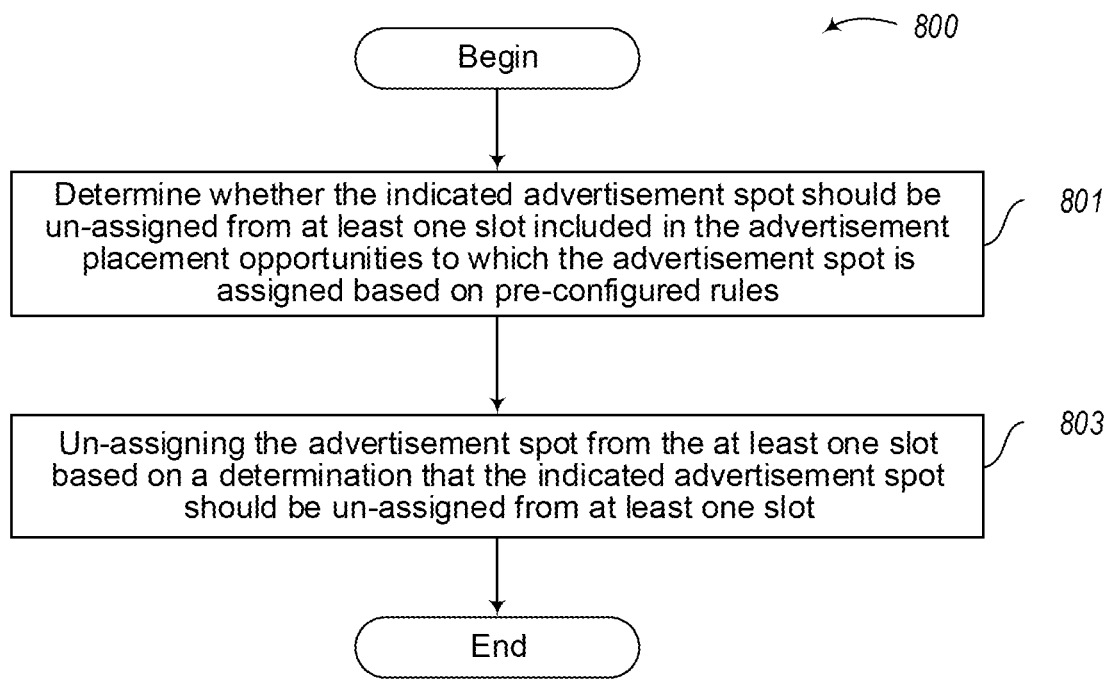
FIG. 8 is a flow diagram showing a method of operating a cross provider assignment system to use input to un-assign an advertisement spot from a slot, according to one non-limiting illustrated implementation.

FIG. 8 is a flow diagram showing a method 800 of operating a cross provider assignment system to use user input to un-assign an advertisement spot from a slot, according to one non-limiting illustrated implementation. After a start block, the method 800 begins at 801, where the cross provider assignment system determines whether the indicated advertisement spot should be un-assigned from at least one slot included in the advertisement placement opportunities to which the advertisement spot is assigned based on pre-configured rules. In some embodiments, before determining whether the indicated advertisement spot should be un-assigned, the cross provider assignment system may present the slots to which the indicated advertisement spot is assigned via a user interface, such as an AFI 103. In some embodiments, the cross provider assignment system presents the slots to which the indicated advertisement spot is assigned to a computing system, algorithm, or other computing device or software.

In some embodiments, the cross provider assignment system receives the pre-configured rules associated with un-assigning the indicated advertisement spot from an entity such as: the roadblock buyer 120, one or more advertisers, or another entity associated with the cross provider assignment system. The pre-configured rules may include one or more rules which instruct the cross provider assignment system to un-assign the indicated advertisement spot from one or more slots. The pre-configured rules may include rules based on: one or more goals of the roadblock buyer; one or more goals of an advertiser; the acceptance of aspects of the advertisement, such as the creative, by one or more advertisers; or other aspects, properties, or requirements of the advertisement, buyer, advertiser, or other entity associated with the cross provider assignment system related to un-assigning the indicated advertisement from one or slots.

At 803, the cross provider assignment system un-assigns the indicated advertisement spot from the at least one assigned slot based on a determination that the advertisement spot should be un-assigned from the at least one slot.

After 803, the method 800 ends.

Figure 9:
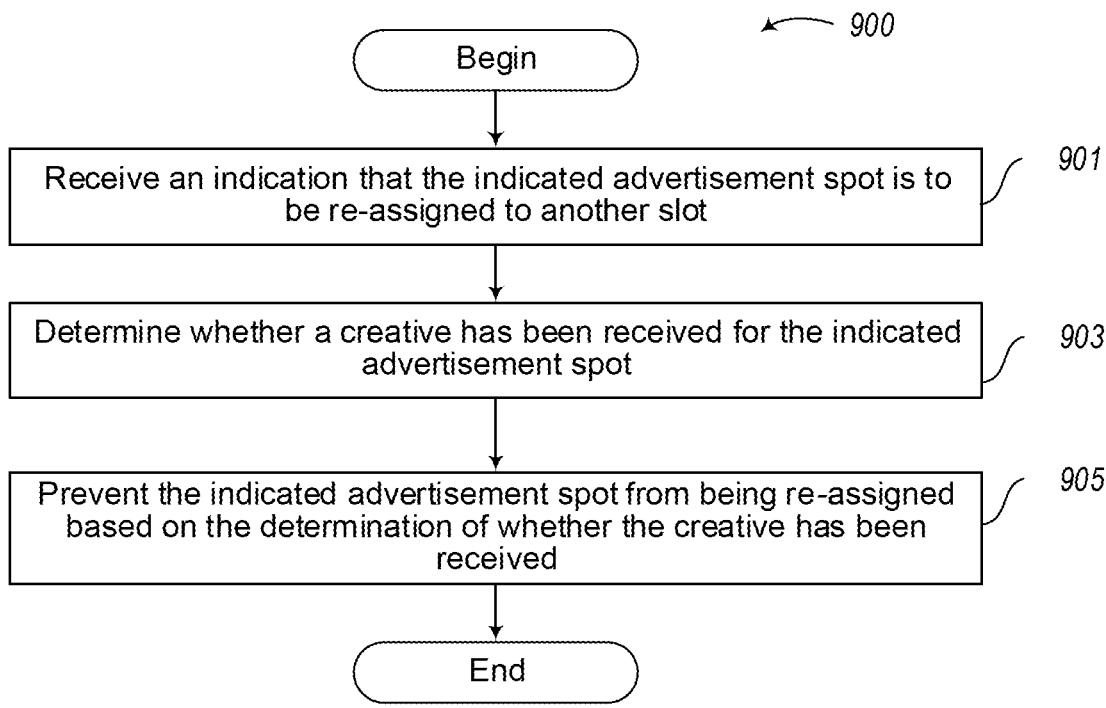
FIG. 9 is a flow diagram showing a method of operating a cross provider assignment system to prevent an advertisement spot from being un-assigned from a slot, according to one non-limiting illustrated implementation.

FIG. 9 is a flow diagram showing a method 900 of operating a cross provider assignment system to prevent an advertisement spot from being un-assigned from a slot, according to one non-limiting illustrated implementation. After a start block, the method 900 begins at 901, where the cross provider assignment system receives an indication that the indicated advertisement spot is to be re-assigned to another slot. In some embodiments, at 901, the cross provider assignment system receives an indication that the indicated advertisement spot is to be un-assigned from a spot.

At 903, the cross provider assignment system determines whether a creative has been received for the indicated advertisement spot.

At 905, the cross provider assignment system prevents the advertisement spot from being re-assigned based on the determination of whether the creative has been received.

After 905, the method 900 ends.

Figure 10:
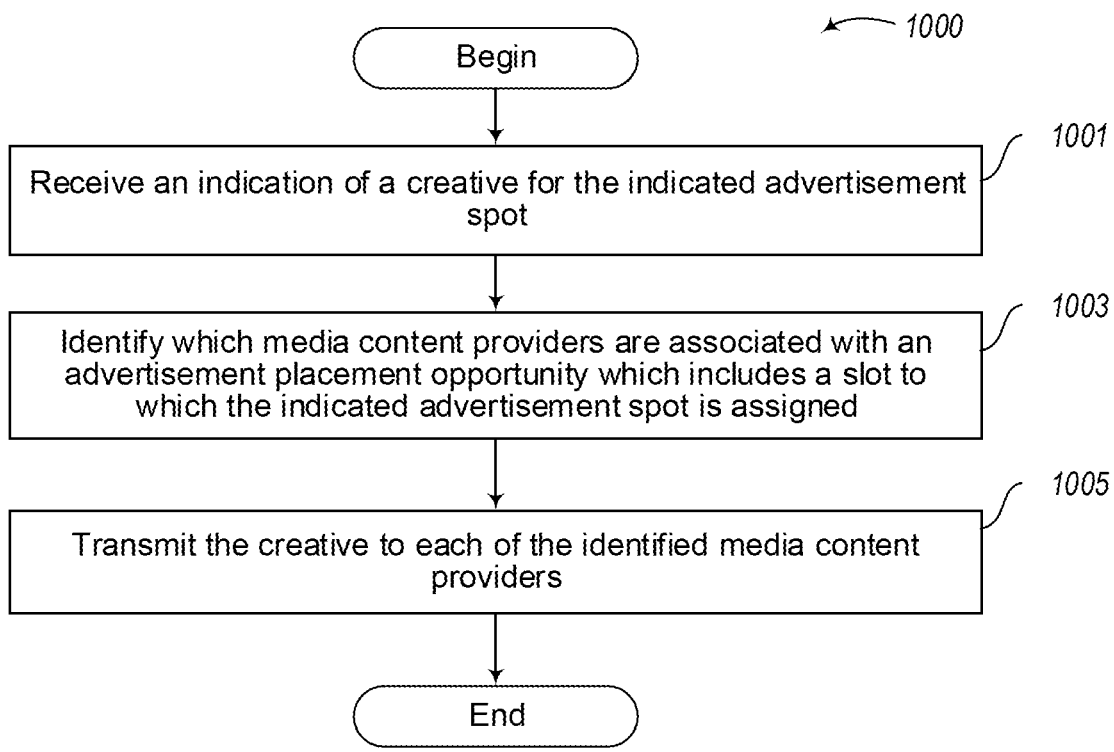
FIG. 10 is a flow diagram showing a method of operating a cross provider assignment system to transmit a creative to a plurality of media content providers, according to one non-limiting illustrated implementation.

FIG. 10 is a flow diagram showing a method 1000 of operating a cross provider assignment system to transmit a creative to a plurality of media content providers, according to one non-limiting illustrated implementation. After a start block, the method 1000 begins at 1001, where the cross provider assignment system receives an indication of a creative for the indicated advertisement spot. In some implementations, the cross provider assignment system receives the indication of the creative via an AFI 103.

At 1003, the cross provider assignment system identifies which media content providers are associated with at least one advertisement placement opportunity which includes a slot to which the indicated advertisement spot is assigned.

At 1005, the cross provider assignment system transmits the creative to each of the identified media content providers.

After 1005, the method 1000 ends.

Figure 11:
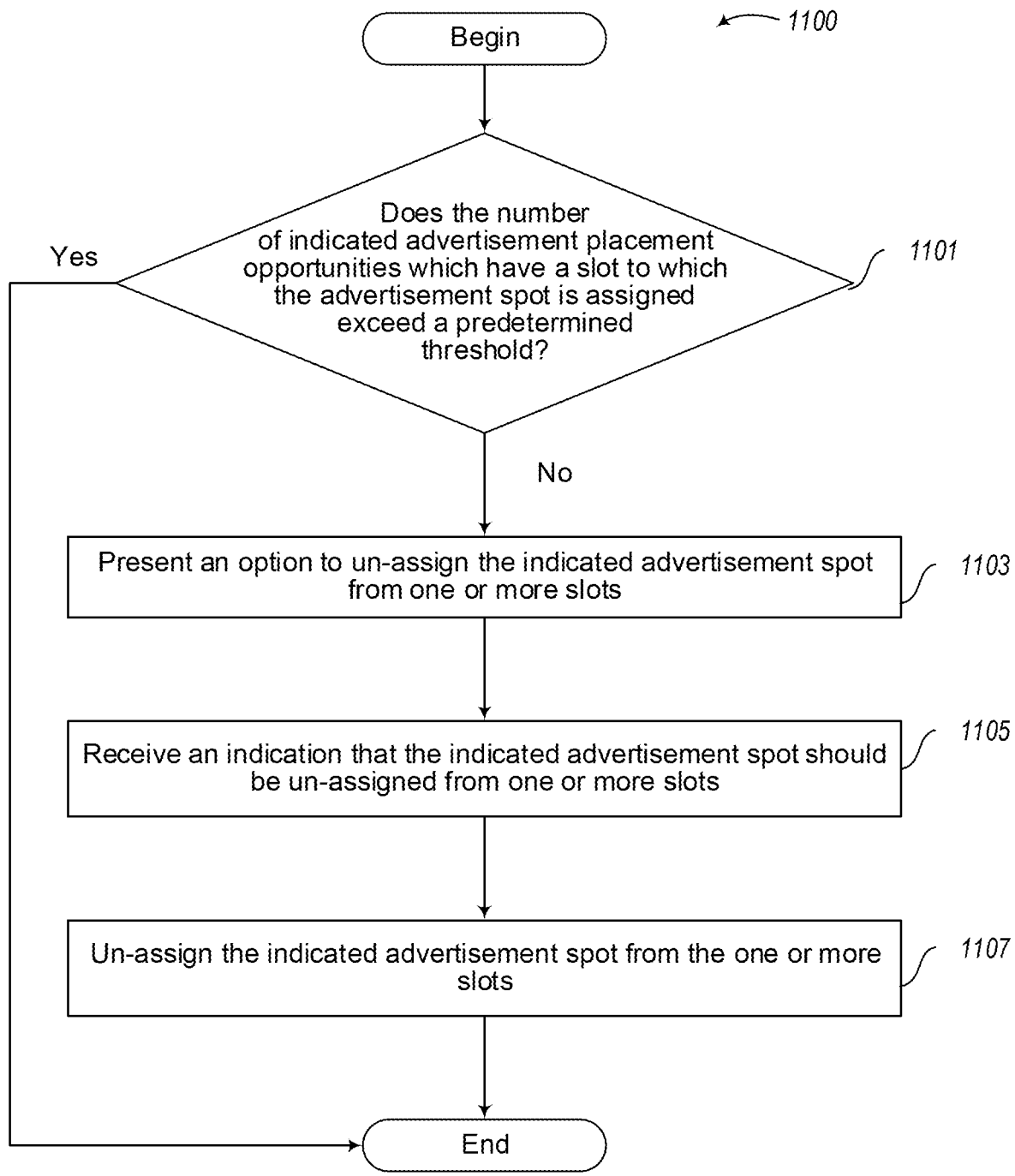
FIG. 11 is a flow diagram showing a method of operating a cross provider assignment system to un-assign the indicated advertisement spot from one or more slots, according to one non-limiting illustrated implementation.

FIG. 11 is a flow diagram showing a method 1100 of operating a cross provider assignment system to allow a user to un-assign the indicated advertisement spot from one or more slots, according to one non-limiting illustrated implementation. After a start block, the method 1100 begins at

1101, where the cross provider assignment system determines whether the number of indicated advertisement placement opportunities which have a slot to which the advertisement spot is assigned exceeds a predetermined threshold.

In some implementations, the predetermined threshold is obtained via user input, such as via an AFI 103. In some implementations, the cross provider assignment system determines the predetermined threshold based on one or more attributes of the advertisement placement opportunities to which the indicated advertisement spot is assigned. For example, the buyer may indicate that they wish their advertisement to receive a certain number of impressions. The cross provider assignment system may determine how many impressions each advertisement placement opportunity could provide, and use that determination to determine whether the buyer's impression goal is met by the advertisement placement opportunities.

If the cross provider assignment system determines that the number of indicated advertisement placement opportunities which have a slot to which the advertisement spot is assigned does exceed the predetermined threshold, the method 1100 ends.

If the cross provider assignment system determines that the number of indicated advertisement placement opportunities which have a slot to which the advertisement spot is assigned does not exceed the predetermined threshold, the method continue to 1103. At 1103, the cross provider assignment system presents an option to un-assign the indicated advertisement spot from one or more slots included in the indicated advertisement placement opportunities. In some implementations, the option to un-assign the indicated advertisement spot is presented to a user via a user interface, such as an AFI 103.

At 1105, the cross provider assignment system receives an indication that the indicated advertisement spot should be un-assigned from one or more spots. The indication that the indicated advertisement should be un-assigned from one or more slots may be received via a user interface, such as an AFI 103.

At 1107, the cross provider assignment system un-assigns the indicated advertisement spots from the one or more indicated slots.

In some embodiments, the buyer may provide to the cross provider assignment system: an impression goal of the buyer, a minimum number of advertising placement opportunities to which the advertisement spot is assigned, a cost-per-mille ("CPM") goal, a minimum number of media content providers associated with advertisement placement opportunities to which the indicated advertisement placement spot is assigned, and other goals a buyer may have for an advertisement or advertisement campaign. In such embodiments, the cross provider assignment system may determine a score goal based on the goals provided by the buyer. The cross provider assignment system may determine as score for the indicated advertisement based on the advertisement placement opportunities to which the indicated advertisement is assigned and the goals provided by the buyer. The cross provider assignment system may then perform acts 1103-1107 based on a determination of whether the determined score exceeds the score goal.

In some implementations, at 1103, the cross provider assignment system presents an option to change one or more goals of the buyer. In some implementations, at 1103, the cross provider assignment system presents an option to change one or more attributes of the advertisement placement opportunities which the buyer would like the advertisement spot to be assigned to. The cross provider assignment system may attempt to find new advertisement placement opportunities for the advertisement spot based on the changed goals, changed attributes of advertisement placement opportunities, etc.

After 1107, the method 1100 ends.

Figure 12:
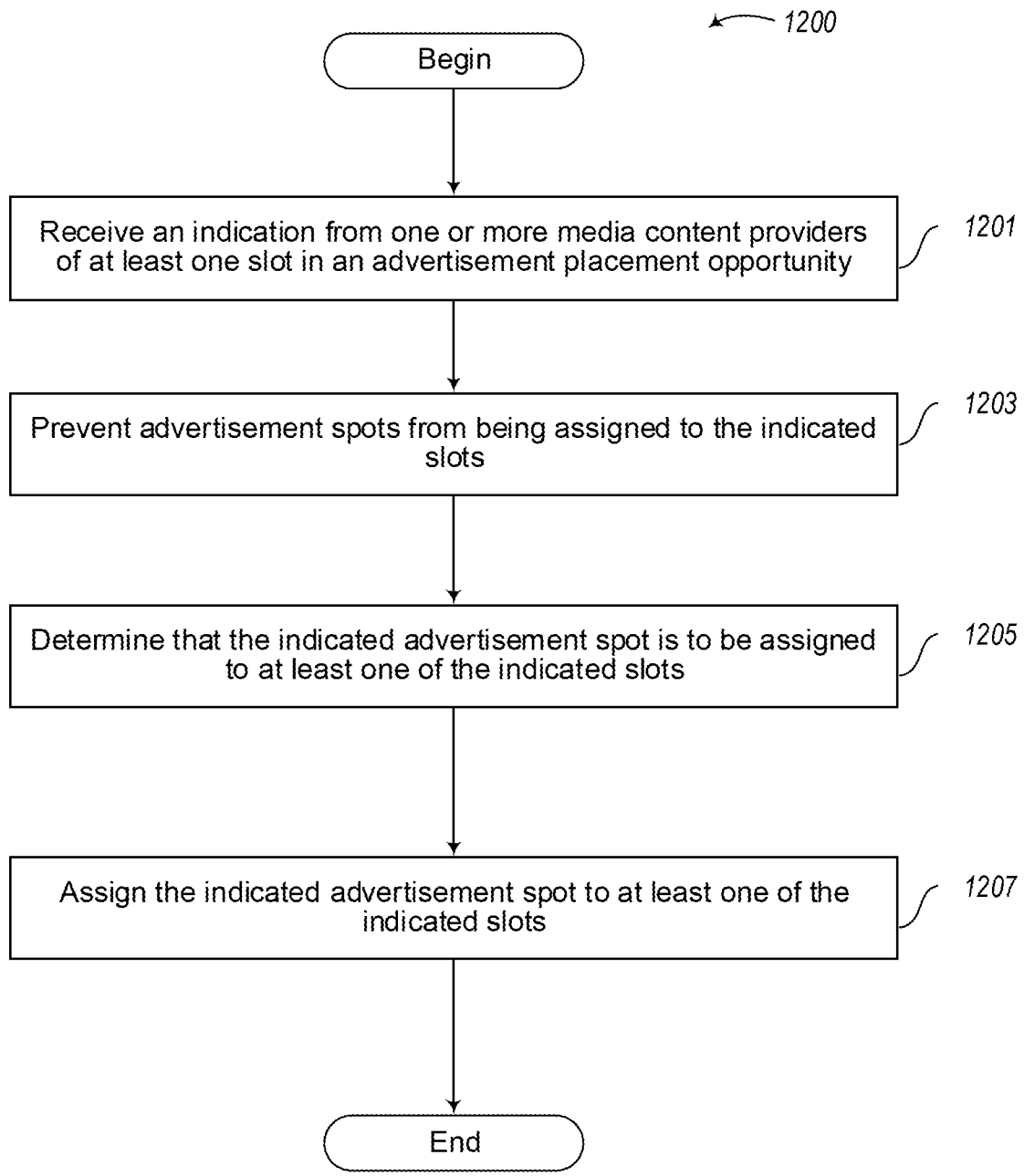
FIG. 12 is a flow diagram showing a method of operating a cross provider assignment system to receive permission from a media content provider to use an advertisement placement opportunity in the cross provider assignment system, according to one non-limiting illustrated implementation.

FIG. 12 is a flow diagram showing a method 1200 of operating a cross provider assignment system to receive permission from a media content provider to use an advertisement placement opportunity in the cross provider assignment system, according to one non-limiting illustrated implementation. After a start block, the method 1200 begins at 1201, where the cross provider assignment system receives an indication from one or more media content providers of at least one slot in an advertisement placement opportunity associated with the respective media content provider. In some implementations, the cross provider assignment system receives the indication via user input, such as via a PFI 105. In some implementations, a media content provider indicates that the cross provider assignment system can only use slots it has indicated in 1201.

At 1203, the cross provider assignment system prevents advertisements other than the indicated advertisement spot to be assigned to the indicated slots.

At 1205, the cross provider assignment system determines that the indicated advertisement spot is to be assigned to at least one of the indicated slots. The cross provider assignment system may determine the indicated slots to which the advertisement spot is to be assigned in a similar manner to the method described in FIG. 5. In some implementations, the cross provider assignment system attempts to assign the indicated advertisement spot to the indicated slots before assigning the advertisement spot to slots which were not indicated by the one or more media content providers. In some implementations, the cross provider assignment system only assigns the indicated advertisement spot to the indicated slots.

At 1207, the cross provider assignment system assigns the indicated advertisement spot to at least one of the indicated slots.

After 1207, the method 1200 ends.

Figure 13:
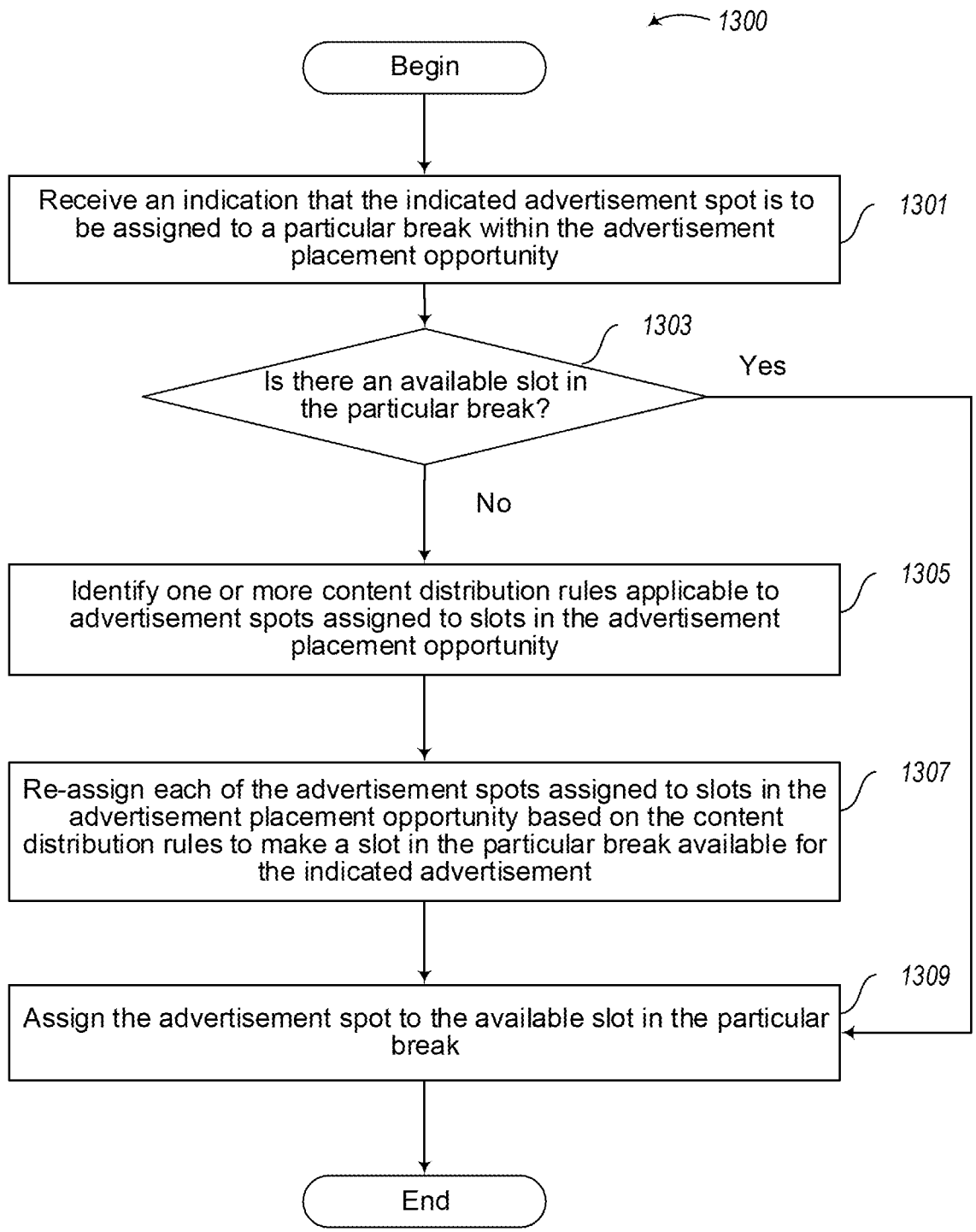
FIG. 13 is a flow diagram showing a method of operating a cross provider assignment system to re-assign advertisement spots to different slots based on content distribution rules, according to one non-limiting illustrated implementation.

FIG. 13 is a flow diagram showing a method 1300 of operating a cross provider assignment system to re-assign advertisement spots to different slots based on content distribution rules, according to one non-limiting illustrated implementation. After a start block, the method 1300 begins at 1301, where the cross provider assignment system receives an indication that the indicated advertisement spot is to be assigned to a particular break within the advertisement placement opportunity. At 1303, the cross provider assignment system determines whether there is an available slot in the particular break. If there is an available slot in the particular break, the method continues to 1309, otherwise the method continues to 1305.

At 1305, the cross provider assignment system identifies one or more content distribution rules applicable to advertisement spots assigned to slots in the advertisement placement opportunity. The content distribution rules may include the content distribution rules 207.

At 1307, the cross provider assignment system re-assigns each of the advertisement spots assigned to slots in the advertisement placement opportunity based on the content distribution rules to make a slot in the particular break available for the indicated advertisement spot. In some implementations, the advertisement spots are assigned to slots in other breaks included in the advertisement placement opportunity.

At 1309, the cross provider assignment system assigns the indicated advertisement spot to the available slot in the particular break.

After 1309, the method 1300 ends. In some implementations, the cross provider assignment system is able to use the method 1300 to ensure that the indicated advertisement spot is assigned to a break which occurs within an indicated time period, while continuing to honor the content distribution rules set by the media content provider, other buyers, etc.

Figure 14:
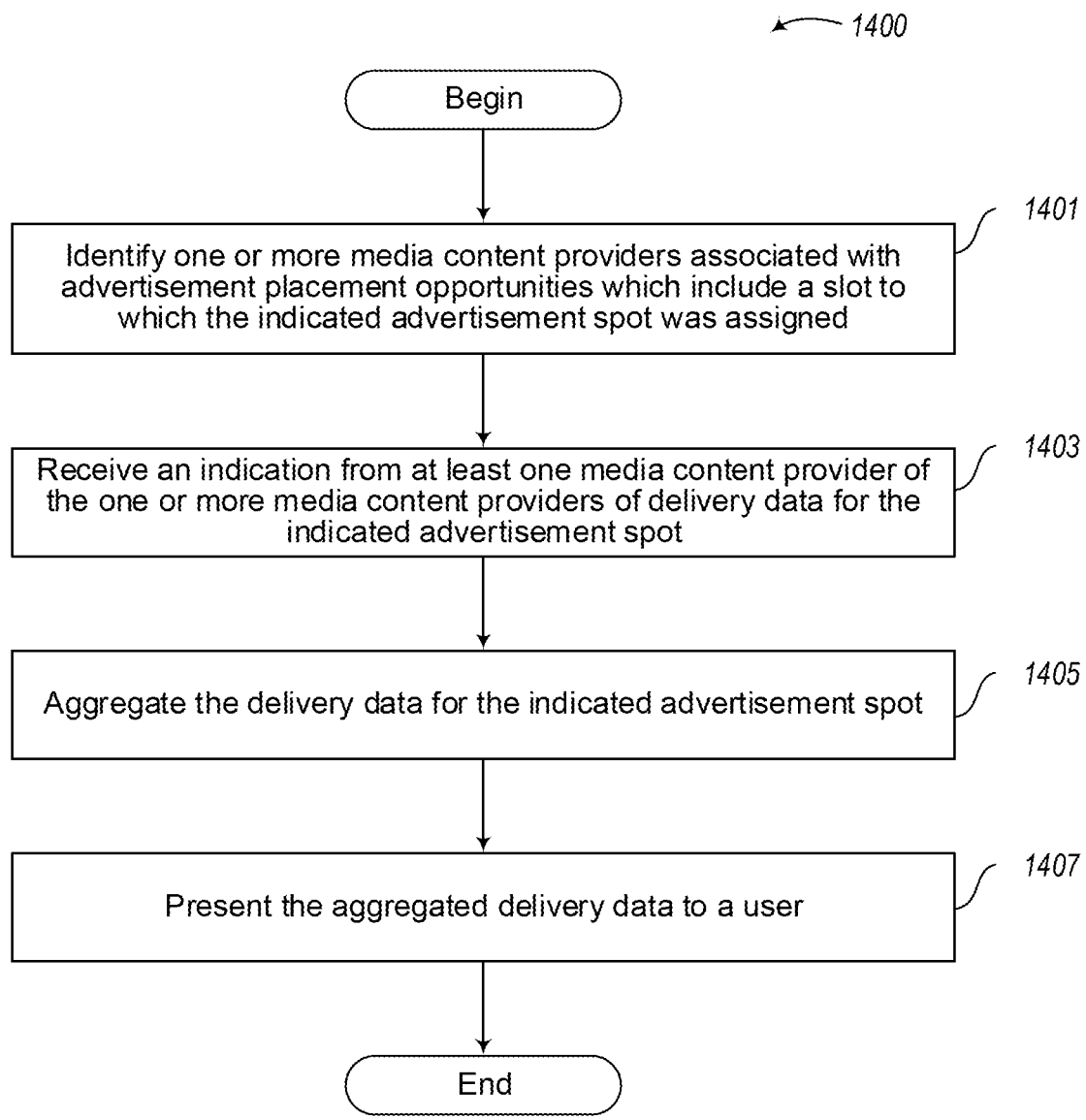
FIG. 14 is a flow diagram showing a method of operating a cross provider assignment system to collect advertisement delivery data from one or more media content providers, according to one non-limiting illustrated implementation.

FIG. 14 is a flow diagram showing a method 1400 of operating a cross provider assignment system to collect advertisement delivery data from one or more media content providers, according to one non-limiting illustrated implementation. After a start block, the method 1400 begins at 1401, where the cross provider assignment system identifies one or more media content providers associated with advertisement placement opportunities which include a slot to which the indicated advertisement spot was assigned.

At 1403, the cross provider assignment system receives an indication from at least one media content provider of the one or more media content providers of delivery data for the indicated advertisement spot. In some implementations, the cross provider assignment system automatically receives the delivery data from the media content provider by connecting to, or communicating with, a computing system which has access to the delivery data. In some implementations, the cross provider assignment system receives the delivery data via user input, such as via a PFI 105.

At 1405, the cross provider assignment system aggregates at least a portion of the delivery data received from each media content provider. In some implementations, the aggregation includes: summing a portion of the delivery data; obtaining a mean, median, or mode for a portion of the delivery data; or other forms of aggregating data. For example, the cross provider assignment system may use the delivery data to determine the average number of impressions obtained from the advertisement placement opportunities, the total number of impressions obtained, etc.

At 1407, the cross provider assignment system presents the aggregated delivery data to a user, such as by using an AFI 103.

After 1407, the method 1400 ends.

Figure 15:
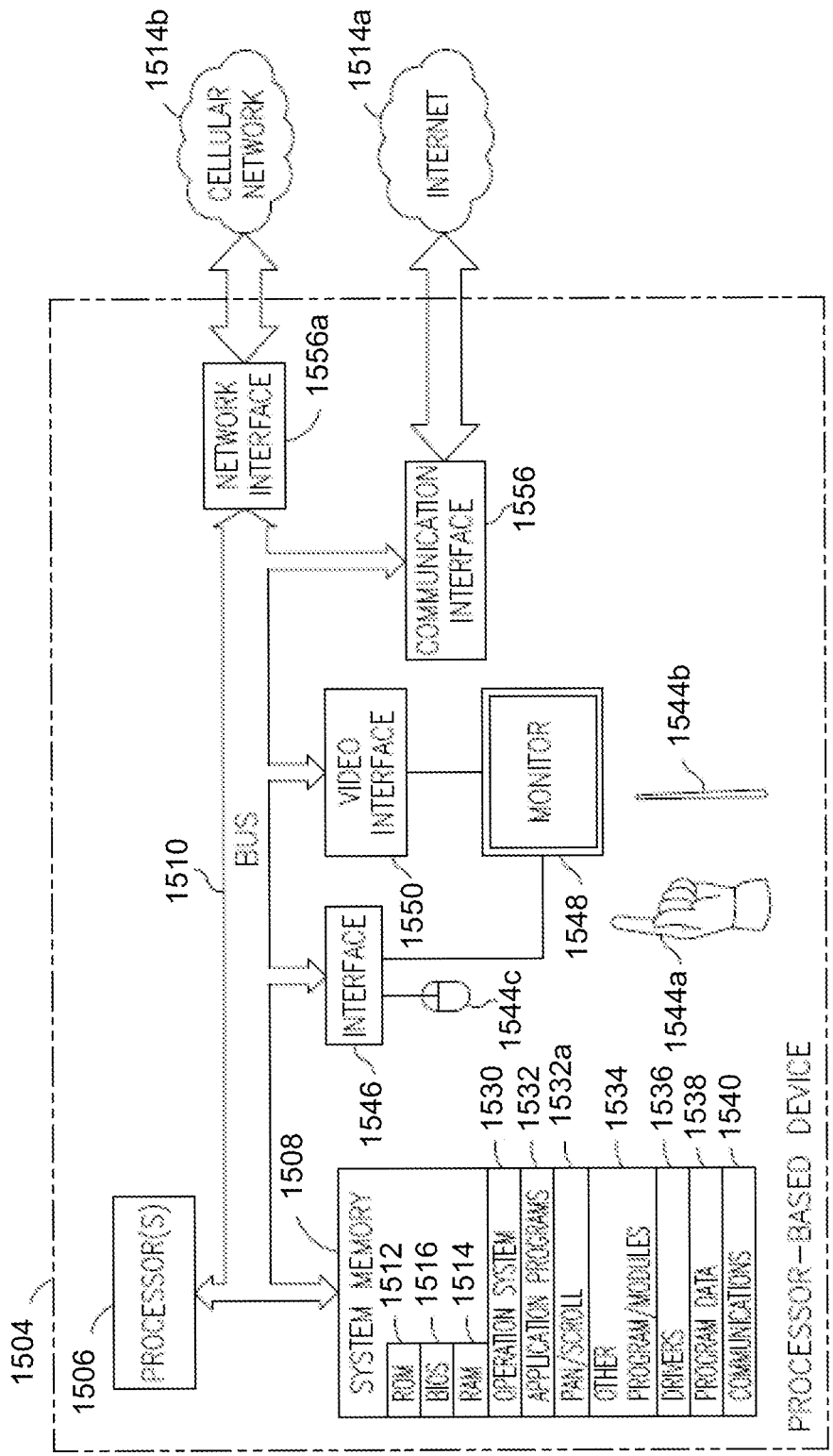
FIG. 15 shows a processor-based device suitable for implementing the various functionality described herein.

FIG. 15 shows a processor-based device 1504 suitable for implementing the various functionality described herein. Although not required, some portion of the implementations will be described in the general context of processor-executable instructions or logic, such as program application modules, objects, or macros being executed by one or more processors. Those skilled in the relevant art will appreciate that the described implementations, as well as other implementations, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

The processor-based device 1504 may include one or more processors 1506, a system memory 1508 and a system bus 1510 that couples various system components including the system memory 1508 to the processor(s) 1506. The processor-based device 1504 will at times be referred to in the singular herein, but this is not intended to limit the implementations to a single system, since in certain implementations, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, 68xxx series microprocessors from Motorola Corporation.

The processor(s) 1506 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 15 are of conventional design. As a result, such blocks need not be described in further detail herein, as they will be understood by those skilled in the relevant art.

The system bus 1510 can employ any known bus structures or architectures, including a memory bus with memory controller, a peripheral bus, and a local bus. The system memory 1508 includes read-only memory ("ROM") 1512 and random access memory ("RAM") 1514. A basic input/output system ("BIOS") 1516, which can form part of the ROM 1512, contains basic routines that help transfer information between elements within processor-based device 1504, such as during start-up. Some implementations may employ separate buses for data, instructions and power.

The processor-based device 1504 may also include one or more solid state memories, for instance Flash memory or solid state drive (SSD) 1518, which provides nonvolatile storage of computer-readable instructions, data structures, program modules and other data for the processor-based device 1504. Although not depicted, the processor-based device 1504 can employ other nontransitory computer- or processor-readable media, for example a hard disk drive, an optical disk drive, or memory card media drive.

Program modules can be stored in the system memory 1508, such as an operating system 1530, one or more application programs 1532, other programs or modules 1534, drivers 1536 and program data 1538.

The application programs 1532 may, for example, include panning/scrolling 1532a. Such panning/scrolling logic may include, but is not limited to logic that determines when and/or where a pointer (e.g., finger, stylus, cursor) enters a user interface element that includes a region having a central portion and at least one margin. Such panning/scrolling logic may include, but is not limited to logic that determines a direction and a rate at which at least one element of the user interface element should appear to move, and causes updating of a display to cause the at least one element to appear to move in the determined direction at the determined rate. The panning/scrolling logic 1532a may, for example, be stored as one or more executable instructions. The panning/scrolling logic 1532a may include processor and/or machine executable logic or instructions to generate user interface objects using data that characterizes movement of a pointer, for example data from a touch-sensitive display or from a computer mouse or trackball, or other user interface device.

The system memory 1508 may also include communications programs 1540, for example a server and/or a Web client or browser for permitting the processor-based device 1504 to access and exchange data with other systems such as user computing systems, Web sites on the Internet, corporate intranets, or other networks as described below. The communications programs 1540 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 15 as being stored in the system memory 1508, the operating system 1530, application programs 1532, other programs/modules 1534, drivers 1536, program data 1538 and server and/or browser 1540 can be stored on any other of a large variety of nontransitory processor-readable media (e.g., hard disk drive, optical disk drive, SSD and/or flash memory).

A user can enter commands and information via a pointer, for example through input devices such as a touch screen 1548 via a finger 1544a, stylus 1544b, or via a computer mouse or trackball 1544c which controls a cursor. Other input devices can include a microphone, joystick, game pad, tablet, scanner, biometric scanning device, etc. These and other input devices (i.e., "I/O devices") are connected to the processor(s) 1506 through an interface 1546 such as touch-screen controller and/or a universal serial bus ("USB") interface that couples user input to the system bus 1510, although other interfaces such as a parallel port, a game port or a wireless interface or a serial port may be used. The touch screen 1548 can be coupled to the system bus 1510 via a video interface 1550, such as a video adapter to receive image data or image information for display via the touch screen 1548. Although not shown, the processor-based device 1504 can include other output devices, such as speakers, vibrator, haptic actuator, etc.

The processor-based device 1504 may operate in a networked environment using one or more of the logical connections to communicate with one or more remote computers, servers and/or devices via one or more communications channels, for example, one or more networks 1514a, 1514b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based device 1504 may include one or more wired or wireless communications interfaces 1514a, 1514b (e.g., cellular radios, WI-FI radios, Bluetooth radios) for establishing communications over the network, for instance the Internet 1514a or cellular network.

In a networked environment, program modules, application programs, or data, or portions thereof, can be stored in a server computing system (not shown). Those skilled in the relevant art will recognize that the network connections shown in FIG. 15 are only some examples of ways of establishing communications between computers, and other connections may be used, including wirelessly.

For convenience, the processor(s) 1506, system memory 1508, network and communications interfaces 1514a, 1514b are illustrated as communicably coupled to each other via the system bus 1510, thereby providing connectivity between the above-described components. In alternative implementations of the processor-based device 1504, the above-described components may be communicably coupled in a different manner than illustrated in FIG. 15. For example, one or more of the above-described components may be directly coupled to other components, or may be coupled to each other, via intermediary components (not shown). In some implementations, system bus 1510 is omitted and the components are coupled directly to each other using suitable connections.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A method of operating a computer system, comprising:
receiving data indicating a plurality of media content providers, each media content provider having one or more advertisement placement opportunities, each advertisement placement opportunity having one or more spots;

for each media content provider of the plurality of media content providers:
    receiving data indicating one or more advertisement spots, wherein each advertisement spot is assigned to at least one slot included in the one or more advertisement placement opportunities of the media content provider, each advertisement spot being assigned a priority score, each advertisement placement opportunity corresponding to a pre-determined time period;
    receiving an indication of a time period;
    identifying a plurality of advertisement placement opportunities based on the indicated time period, such that the respective time periods corresponding to each of the indicated advertisement placement opportunities overlap with each other;
    receiving an indication that an advertisement spot is to be assigned to a slot of the plurality of advertisement placement opportunities, the plurality of advertisement placement opportunities comprising at least one advertisement placement opportunity of two or more media content providers of the plurality of media content providers; and
    for each advertisement placement opportunity of the plurality of advertisement placement opportunities:
        determining whether there are any slots included in the advertisement placement opportunity to which an advertisement spot is not assigned;
        based on a determination that there is a slot to which an advertisement spot is not assigned, assigning the indicated advertisement spot to the slot; and
        based on a determination that there are no slots included in the advertisement placement opportunity to which an advertisement spot is not assigned:
            determining which advertisement spot has the lowest priority score;
            un-assigning the previously assigned advertisement spot determined to have the lowest priority score from the slot to which it is assigned;
            assigning the indicated advertisement spot to the slot to which the previously assigned advertisement was previously assigned; and
            re-assigning the previously assigned advertisement spot to a new slot within an advertisement placement opportunity.

2. The method of claim 1, wherein the pre-determined time period is thirty minutes.

3. The method of claim 1, further comprising:
determining whether one or more advertisement placement opportunities does not have a slot to which the advertisement spot can be assigned;
receiving input indicating that the time period should be extended; and
extending the time period based on the input.

4. The method of claim 1, wherein the time periods for the advertisement placement opportunities corresponding to at least one media content provider of the two or more media content providers are in a different time zone than the advertisement placement opportunities corresponding to at least one other media content provider of the two or more media content providers.

5. The method of claim 1, wherein each media content provider of the two or more media content providers provides content to at least one geographic region, and wherein the at least one geographic region corresponding to at least one media content provider of the two or more media content providers is different from the geographic region of at least one other media content provider of the two or more media content providers.

6. The method of claim 1, wherein each advertisement spot further comprises advertisement information, and wherein assigning the indicated advertisement spot to a slot further comprises:
identifying one or more rules for placing advertisement spots in slots relative to other advertisement spots placed in other slots;
determining whether to assign the indicated advertisement spot to a slot based on the identified one or more rules, the advertisement information for the indicated advertisement spot, and the advertisement information for at least one other advertisement spot; and
preventing the indicated advertisement spot from being assigned to the slot based on a determination that the indicated advertisement spot should not be assigned to the slot.

7. The method of claim 1, further comprising:
determining, based on pre-configured rules, whether the indicated advertisement spot should be un-assigned from at least one slot included in the advertisement placement opportunities to which the advertisement spot is assigned; and
based on the determining, un-assigning the indicated advertisement spot from the at least one slot.

8. The method of claim 1, wherein assigning the indicated advertisement spot to a slot further comprises:
determining whether a creative material has been received for the indicated advertisement spot; and
preventing the indicated advertisement spot from being re-assigned to another slot based on a determination of that the creative material has been received for the indicated advertisement spot.

9. The method of claim 1, wherein receiving data indicating one or more advertisement spots further comprises:
calculating the priority score for each advertisement spot associated with the media content provider based on information received from the media content provider.

10. The method of claim 1, further comprising:
receiving a creative for the indicated advertisement spot; and
transmitting the creative to each media content provider associated with the indicated advertisement placement opportunities which include a slot to which the indicated advertisement spot is assigned.

11. A method of operating a computer system, comprising:
receiving data indicating a plurality of media content providers, each media content provider having one or more advertisement placement opportunities, each advertisement placement opportunity having one or more spots;
for each media content provider of the plurality of media content providers:
    receiving data indicating one or more advertisement spots, wherein each advertisement spot is assigned to at least one slot included in the one or more advertisement placement opportunities of the media content provider, each advertisement spot being assigned a priority score;
    receiving an indication that an advertisement spot is to be assigned to a slot of a plurality of advertisement placement opportunities, the plurality of advertisement placement opportunities comprising at least one advertisement placement opportunity of two or more media content providers of the plurality of media content providers;

for each advertisement placement opportunity of the plurality of advertisement placement opportunities:
  determining whether there are any slots included in the advertisement placement opportunity to which an advertisement spot is not assigned;
  based on a determination that there is a slot to which an advertisement spot is not assigned, assigning the indicated advertisement spot to the slot; and
  based on a determination that there are no slots included in the advertisement placement opportunity to which an advertisement spot is not assigned:
    determining which advertisement spot has the lowest priority score;
    un-assigning the previously assigned advertisement spot determined to have the lowest priority score from the slot to which it is assigned;
    assigning the indicated advertisement spot to the slot to which the previously assigned advertisement was previously assigned; and
    re-assigning the previously assigned advertisement spot to a new slot within an advertisement placement opportunity;
  determining whether the number of media content providers associated with the plurality of advertisement placement opportunities which have a slot to which the indicated advertisement spot is assigned does not exceed a predetermined number of media content providers;
  based on a determination that the number of media content providers does not exceed the predetermined number of media content providers, presenting an option to un-assign the indicated advertisement spot from one or more slots;
  receiving input indicating that the indicated advertisement spot should be un-assigned from one or more slots; and
  un-assigning the indicated advertisement spot from one or more slots based on the received input.

12. A system to optimize the placement of advertisement spots at advertisement placement opportunities offered by multiple media content providers, the system comprising:
  at least one nontransitory processor-readable storage medium that stores at least one of instructions or data; and
  at least one processor communicatively coupled to the at least one nontransitory processor-readable storage medium, wherein the instructions or data cause the at least one processor to:
    receive data representing a plurality of media content providers, each media content provider having one or more advertisement placement opportunities, each advertisement placement opportunity having one or more spots, each advertisement placement opportunity occurring during a time period;
    for each media content provider of the plurality of media content providers:
      receive data indicating one or more advertisement spots, wherein each advertisement spot is assigned to at least one slot included in the one or more advertisement placement opportunities of the media content provider, each advertisement spot being assigned a priority score;
    receive an indication of a selected time period; and
    identify a plurality of advertisement placement opportunities based on the selected time period, such that the respective time periods corresponding to each of the plurality of advertisement placement opportunities overlap with each other;
    receive an indication that an advertisement spot is to be assigned to a slot of the plurality of advertisement placement opportunities, the plurality of advertisement placement opportunities comprising at least one advertisement placement opportunity of two or more media content providers of the plurality of media content providers; and
    for each advertisement placement opportunity of the plurality of indicated advertisement placement opportunities:
      determine whether there are any slots included in the advertisement placement opportunity to which an advertisement spot is not assigned;
      based on a determination that there is a slot to which an advertisement spot is not assigned, assign the indicated advertisement spot to the slot; and
      based on a determination that there are no slots included in the advertisement placement opportunity to which an advertisement spot is not assigned:
        determine which advertisement spot has the lowest priority score;
        un-assign the previously assigned advertisement spot determined to have the lowest priority score from the slot to which it is assigned;
        assign the indicated advertisement spot to the slot to which the previously assigned advertisement was previously assigned; and
        re-assign the previously assigned advertisement spot to a new slot within an advertisement placement opportunity.

13. The system of claim 12, wherein the processor is further caused to:
  determine whether one or more advertisement placement opportunities does not have a slot to which the advertisement spot can be assigned;
  receive input indicating that the time period should be extended; and
  extending the time period based on the input.

14. The system of claim 12, wherein each advertisement spot further comprises advertisement information, causing the processor to assign the indicated advertisement spot to a slot further comprises causing the processor to:
  identify one or more rules for placing advertisement spots in slots relative to other advertisement spots placed in slots;
  determine whether to assign the indicated advertisement spot to a slot based on the identified one or more rules, the advertisement information for the indicated advertisement spot, and the advertisement information for at least one other advertisement spot; and
  prevent the indicated advertisement spot from being assigned to the slot based on a determination that the indicated advertisement spot should not be assigned to the slot.

15. The system of claim 12, wherein causing the processor to assign the indicated advertisement spot to a slot further comprises causing the processor to:
  determine whether creative material has been received for the indicated advertisement spot; and
  prevent the indicated advertisement spot from being re-assigned to another slot based on a determination of that the creative material has been received for the indicated advertisement spot.

16. The system of claim 12, wherein the processor is further caused to:

receive creative material for the indicated advertisement spot; and transmit the creative material to each media content provider associated with the indicated advertisement placement opportunities which includes a slot to which the indicated advertisement spot is assigned.

17. A system to optimize the placement of advertisement spots at advertisement placement opportunities offered by multiple media content providers, the system comprising:

at least one nontransitory processor-readable storage medium that stores at least one of instructions or data; and at least one processor communicatively coupled to the at least one nontransitory processor-readable storage medium, wherein the instructions or data cause the at least one processor to:

receive data representing a plurality of media content providers, each media content provider having one or more advertisement placement opportunities, each advertisement placement opportunity having one or more spots;

for each media content provider of the plurality of media content providers:

receive data indicating one or more advertisement spots, wherein each advertisement spot is assigned to at least one slot included in the one or more advertisement placement opportunities of the media content provider, each advertisement spot being assigned a priority score;

receive an indication that an advertisement spot is to be assigned to a slot of a plurality of advertisement placement opportunities, the plurality of advertisement placement opportunities comprising at least one advertisement placement opportunity of two or more media content providers of the plurality of media content providers;

for each advertisement placement opportunity of the plurality of indicated advertisement placement opportunities:

determine whether there are any slots included in the advertisement placement opportunity to which an advertisement spot is not assigned;

based on a determination that there is a slot to which an advertisement spot is not assigned, assign the indicated advertisement spot to the slot; and based on a determination that there are no slots included in the advertisement placement opportunity to which an advertisement spot is not assigned:

determine which advertisement spot has the lowest priority score;

un-assign the previously assigned advertisement spot determined to have the lowest priority score from the slot to which it is assigned;

assign the indicated advertisement spot to the slot to which the previously assigned advertisement was previously assigned; and re-assign the previously assigned advertisement spot to a new slot within an advertisement placement opportunity;

determine a score goal based on one or more of: an impression goal, a minimum number of advertisement placement opportunities to which the indicated advertisement spot is assigned, and a CPM goal;

determine a score for the plurality of advertisement placement opportunities that have a slot to which the advertisement spot can be assigned based on one or more of: a projected number of impressions for each of the plurality of advertisement placement opportunities, the number of the plurality of advertisement placement opportunities to which the indicated advertisement spot is assigned, and a projected CPM for each of the plurality of advertisement placement opportunities;

determine whether the score for the plurality of advertisement placement opportunities exceeds the score goal;

based on a determination that the score of the plurality of advertisement placement opportunities does not exceed the score goal, present to a user an option to un-assign the indicated advertisement spot from one or more slots;

receive input indicating the at the indicated advertisement spot should be un-assigned from one or more slots; and un-assign the indicated advertisement spot from one or more spots based on the received input.

18. A nontransitory processor-readable storage medium that stores at least one of instructions or data, the instructions or data, when executed by at least one processor, cause the at least one processor to:

receive data representing a plurality of media content providers, each media content provider having one or more advertisement placement opportunities, each advertisement placement opportunity having one or more spots;

for each media content provider of the plurality of media content providers:

receive data indicating one or more advertisement spots, wherein each advertisement spot is assigned to at least one slot included in the one or more advertisement placement opportunities of the media content provider, each advertisement spot being assigned a priority score;

receive an indication of a selected time period; and identify a plurality of advertisement placement opportunities based on the selected time period, such that one or more time periods corresponding to each of the plurality of advertisement placement opportunities overlap with each other;

receive an indication that an advertisement spot is to be assigned to a slot of the plurality of advertisement placement opportunities, the plurality of advertisement placement opportunities comprising at least one advertisement placement opportunity of two or more media content providers of the plurality of media content providers; and for each advertisement placement opportunity of the plurality of indicated advertisement placement opportunities:

determine whether there are any slots included in the advertisement placement opportunity to which an advertisement spot is not assigned;

based on a determination that there is a slot to which an advertisement spot is not assigned, assign the indicated advertisement spot to the slot; and based on a determination that there are no slots included in the advertisement placement opportunity to which an advertisement spot is not assigned:

determine which advertisement spot has the lowest priority score;

un-assign the previously assigned advertisement spot from the slot to which it is assigned;
assign the indicated advertisement spot to the slot to which the previously assigned advertisement was previously assigned; and
re-assign the previously assigned advertisement spot to a new slot within an advertisement placement opportunity.

\* \* \* \* \*